US012711397B2

(12) United States Patent
Manda et al.

(10) Patent No.: US 12,711,397 B2
(45) **Date of Patent: *Aug. 18, 2026**

(54) MULTIMODAL TABLE EXTRACTION AND SEMANTIC SEARCH IN A MACHINE LEARNING PLATFORM FOR STRUCTURING DATA IN ORGANIZATIONS

(71) Applicant: ExlService Holdings, Inc., New York, NY (US)

(72) Inventors: Chaithanya Manda, Jersey City, NJ (US); Anupam Kumar, Jersey City, NJ (US); Solmaz Torabi, Austin, TX (US); Raman Kumar, New Delhi (IN); Anish Goswami, Pune (IN); Sidhant Agarwal, Ranchi (IN); Md Sharique, Bandel (IN); Diksha Malhotra, Mohali (IN); Garimella Venkata BhanuTeja, Vijayawada (IN); Arvind Singh, Dehradun (IN); Pavan Praneeth, Hyderabad (IN)

(73) Assignee: ExlService Holdings, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 19/058,885

(22) Filed: Feb. 20, 2025

(65) Prior Publication Data

US 2025/0384301 A1 Dec. 18, 2025

Related U.S. Application Data

(63) Continuation of application No. 18/367,920, filed on Sep. 13, 2023, now Pat. No. 12,260,342, which is a (Continued)

(51) Int. Cl.

| | |
|---|---|
| ***G06N 5/01*** | (2023.01) |
| ***G06F 16/31*** | (2019.01) |
| ***G06F 16/334*** | (2025.01) |

(52) U.S. Cl.

CPC ............... *G06N 5/01* (2023.01); *G06F 16/31* (2019.01); *G06F 16/3344* (2019.01)

(58) Field of Classification Search

CPC ........... G06N 5/01; G06N 3/04; G06N 3/045; G06N 3/0455; G06N 3/0464; G06N 3/08; G06N 3/0895; G06N 3/09; G06N 3/091; G06N 3/092; G06N 3/094; G06N 3/096; G06N 3/098; G06N 3/0985; G06N 20/00; G06N 5/022; G06F 16/22; G06F 16/2282; G06F 16/245; G06F 40/279; G06F 40/30; G06F 3/04842; G06V 10/255;

(Continued)

(56) References Cited

U.S. PATENT DOCUMENTS

| | | | | |
|---|---|---|---|---|
| 12,046,063 | B2 * | 7/2024 | Berestovsky ........ | G06V 30/413 |
| 2019/0340240 | A1 * | 11/2019 | Duta ..................... | G06V 30/15 |

(Continued)

*Primary Examiner* — Amy Ng
*Assistant Examiner* — Cheryl M Shechtman
(74) *Attorney, Agent, or Firm* — Ashurst Perkins Coie

(57) ABSTRACT

Systems, methods, and computer-readable media for computer-assisted output validation in machine learning/artificial intelligence platforms are disclosed. An application instance includes one or more machine learning models used to generate searchable data structures based on multimodal inputs.

19 Claims, 25 Drawing Sheets

Related U.S. Application Data continuation-in-part of application No. 17/988,684, filed on Nov. 16, 2022, now Pat. No. 11,842,286.

(60) Provisional application No. 63/280,062, filed on Nov. 16, 2021.

(58) Field of Classification Search
CPC ........ G06V 10/82; G06V 20/62; G06V 30/10; G06V 30/412; G06V 30/413; G06V 30/414; G06V 40/1347
See application file for complete search history.

(56) References Cited

U.S. PATENT DOCUMENTS

| | | | | |
|---|---|---|---|---|
| 2021/0240976 | A1* | 8/2021 | Tiyyagura | G06V 30/414 |
| 2022/0222284 | A1* | 7/2022 | Sahoo | G06F 16/316 |
| 2022/0318224 | A1* | 10/2022 | Thompson | G06V 30/414 |
| 2023/0065915 | A1* | 3/2023 | Berestovsky | G06F 18/22 |
| 2023/0121351 | A1* | 4/2023 | Becker | G06V 30/413<br>715/217 |
| 2023/0153641 | A1* | 5/2023 | Manda | G06F 40/295<br>707/603 |

* cited by examiner

Input Image 520

Table Detection and Table Cropping 522

Table 2: Characteristics of VC Investments

Table 2 reports the characteristics of VC investments based on discrete responses by farms. Panel A refers to investment stage and reports the proportion of funds investing in different investment stages: "early" refers to need and start-up, "middle" to expanses and growth, and "late" to later stages. Panel B refers to the section of investment using five props of industries: life sciences, IT and software, electrical and semi-conductors, manufacturing and chemicals, and other industries (further discussions of the calculatice used to derive these results is in the text). Panel C records the percentage of funds investing in one, two, three, or four or more industries. Panel D records the regional, national or international nature of investments by funds. It reports the percentage of funds investing in a region within a country, in several regions within a country, within a single continent, or in two or more continents (or in the case of Japan if more than 50 percent is invested abroad) *and**denote ____ values which are statistically different from those of the UK at the 10 and 5 percent levels, respectively.

Panel A: VC Investments by Stage

| | Funds | Early (1) | Middle (2) | Late (3) | Average Stage |
|---|---|---|---|---|---|
| Germany | 187 | 0.68** | 0.89* | 0.74 | 2.0** |
| Israel | 98 | 0.93** | 0.49** | 0.28** | 1.4** |
| Japan | 57 | 0.15** | 0.19** | 0.65** | 2.5** |
| UK | 140 | 0.48 | 0.84 | 0.80 | 2.1 |

| | Funds | Early (1) | Middle (2) | Late (3) | Average Stage |
|---|---|---|---|---|---|
| Germany | 187 | 0.68** | 0.89* | 0.74 | 2.0** |
| Israel | 98 | 0.93** | 0.49** | 0.28** | 1.4** |
| Japan | 57 | 0.15** | 0.19** | 0.65** | 2.5** |
| UK | 140 | 0.48 | 0.84 | 0.80 | 2.1 |

A

Panel B: VC Investments by Industry

| | Funds | Life Sciences | IT and Software | Elect and Semi-C | Mnfg and Chemicals | Other Industries |
|---|---|---|---|---|---|---|
| Germany | 183 | 0.21 | 0.23 | 0.16 | 0.23 | 0.17 |
| Israel | 95 | 0.24** | 0.51** | 0.16 | 0.08** | 0.01** |
| Japan | 56 | 0.26* | 0.49** | 0.05** | 0.06** | 0.14 |
| UK | 140 | 0.17 | 0.26 | 0.15 | 0.24 | 0.19 |

| | Funds | Life Sciences | IT and Software | Elect and Semi-C | Mnfg and Chemicals | Other Industries |
|---|---|---|---|---|---|---|
| Germany | 183 | 0.21 | 0.23 | 0.16 | 0.23 | 0.17 |
| Israel | 95 | 0.24** | 0.51** | 0.16 | 0.08** | 0.01** |
| Japan | 56 | 0.26* | 0.49** | 0.05** | 0.06** | 0.14 |
| UK | 140 | 0.17 | 0.26 | 0.15 | 0.24 | 0.19 |

B

Panel C: Percentage of Funds Investing in Certain Number of Industries

| | 1 | 2 | 3 | 4 or more |
|---|---|---|---|---|
| Germany | 9% | 16% | 15% | 60% |
| Israel | 39% | 23% | 17% | 21% |
| Japan | 3% | 12% | 42% | 42% |
| UK | 11% | 7% | 7% | 75% |

| | 1 | 2 | 3 | 4 or more |
|---|---|---|---|---|
| Germany | 9% | 16% | 15% | 60% |
| Israel | 39% | 23% | 17% | 21% |
| Japan | 3% | 12% | 42% | 42% |
| UK | 11% | 7% | 7% | 75% |

| ◢ | A | B | C | D | E | F |
|---|---|---|---|---|---|---|
| 1 | | Funds | Early (1) | Middle (2) | Late (3) | Average Stage |
| 2 | Germany | 187 | 0.68** | 0.89* | 0.74 | 2.0** |
| 3 | Israel | 98 | 0.93** | 0.49** | 0.28** | 1.4** |
| 4 | Japan | 57 | 0.15** | 0.19** | 0.65** | 2.5** |
| 5 | UK | 140 | 0.48 | 0.84 | 0.80 | 2.1 |

| ◢ | A | B | C | D | E | F | G |
|---|---|---|---|---|---|---|---|
| 1 | | Funds | Life Sciences | IT and Software | Elect and Semi-C | Mnfg and Chemicals | Other Industries |
| 2 | Germany | 183 | 0.21 | 0.23 | 0.16 | 0.23 | 0.17 |
| 3 | Israel | 95 | 0.24** | 0.51** | 0.16 | 0.08** | 0.01** |
| 4 | Japan | 56 | 0.26* | 0.49** | 0.05** | 0.06** | 0.14 |
| 5 | UK | 140 | 0.17 | 0.26 | 0.15 | 0.24 | 0.19 |

| ◢ | A | B | C | D | E |
|---|---|---|---|---|---|
| 1 | | 1 | 2 | 3 | 4 or more |
| 2 | Germany | 9% | 16% | 15% | 60% |
| 3 | Israel | 39% | 23% | 17% | 21% |
| 4 | Japan | 3% | 12% | 42% | 42% |
| 5 | UK | 11% | 7% | 7% | 75% |

550

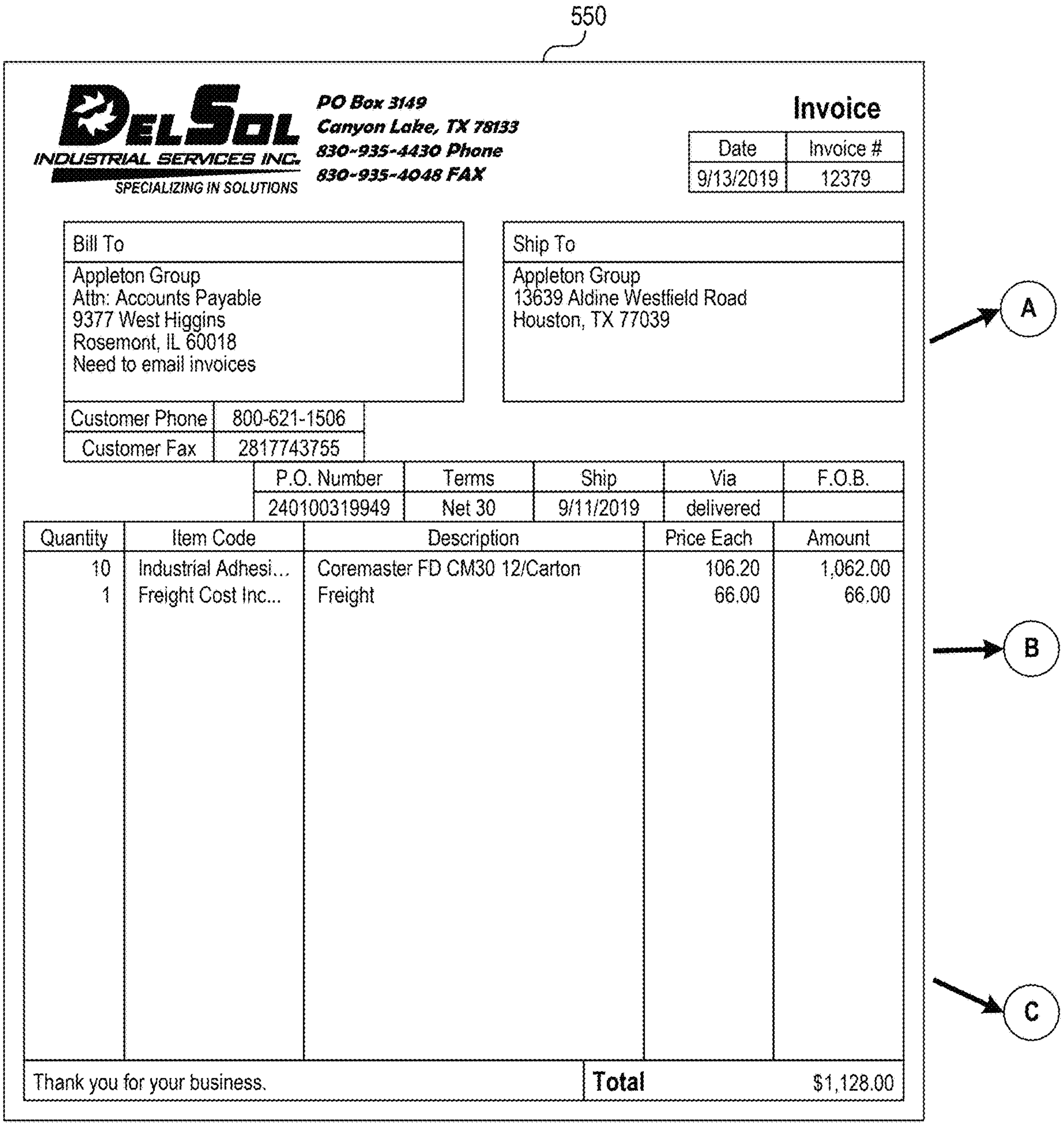

DELSOL INDUSTRIAL SERVICES INC.
SPECIALIZING IN SOLUTIONS

PO Box 3149
Canyon Lake, TX 78133
830-935-4430 Phone
830-935-4048 FAX

Invoice

| Date | Invoice # |
|---|---|
| 9/13/2019 | 12379 |

| Bill To | Ship To |
|---|---|
| Appleton Group<br>Attn: Accounts Payable<br>9377 West Higgins<br>Rosemont, IL 60018<br>Need to email invoices | Appleton Group<br>13639 Aldine Westfield Road<br>Houston, TX 77039 |

| | |
|---|---|
| Customer Phone | 800-621-1506 |
| Customer Fax | 2817743755 |

| P.O. Number | Terms | Ship | Via | F.O.B. |
|---|---|---|---|---|
| 240100319949 | Net 30 | 9/11/2019 | delivered | |

| Quantity | Item Code | Description | Price Each | Amount |
|---|---|---|---|---|
| 10 | Industrial Adhesi... | Coremaster FD CM30 12/Carton | 106.20 | 1,062.00 |
| 1 | Freight Cost Inc... | Freight | 66.00 | 66.00 |

| | | |
|---|---|---|
| Thank you for your business. | **Total** | $1,128.00 |

Input Image

⚠ All copayment and coinsurance costs shown in this chart are after your deductible has been met, if a deductible applies.

| Common Medical Event | Services You May Need | What You Will Pay | | Limitations Exceptions, & Other Important Information |
|---|---|---|---|---|
| | | Network Provider (You will pay the least) | Out-of-Network Provider (You will pay the most) | |
| If you visit a health care provider's office or clinic | Primary care visit to treat an injury or illness | $25 copay/office visit and $10 copay/virtual care visit; deductible does not apply | Not covered | No charge for virtual care visit with CirrusMD. |
| | Specialist visit | $50 copay/office visit, $10 copay/virtual care visit; $45 copay/hearing exam visit; deductible does not apply | Not covered | Office visits by naturopaths, acupuncturists and chiropractors are specialist visits. No charge for virtual care visit with CirrusMD. Spinal manipulation, acupuncture care and naturopathic substances are not covered. |
| | Preventive care/ screening/ immunization | No charge for most services, $25 copay/ visit, deductible does not apply or 25% coinsurance for remaining services. | Not covered | You may have to pay for services that aren't preventive. Ask your provider if the services needed are preventive. Then check what your plan will pay for. |
| If you have a test | Diagnostic test (x-ray blood work) | 25% coinsurance | Not covered | Includes other tests such as EKG, allergy testing and sleep study. |
| | Imaging (CT/ PET scans, MRIs) | 25% coinsurance | Not covered | Prior authorization is required for many services. Failure to get prior authorization results in denial. |
| If you need drugs to treat your illness or condition<br>More information about prescription drug coverage is available at www.modalhealth.com/pdl | Value tier | $2 copay/retail prescription, $6 copay/90-day retail and mail order prescription; deductible does not apply | $2 copay/retail prescription, deductible does not apply | Covers up to a 30-day supply (retail pharmacy) and 90-day supply (mail order and participating retail pharmacies). One copay for each 30-day supply. Prior authorization may be required. Mail order at a Moda Health designated mail order pharmacy only. |
| | Select tier | $10 copay/retail prescription, $30 copay/90-day retail and mail order prescription; deductible does not apply | $10 copay/retail prescription, deductible does not apply | |
| | Preferred tier | 40% coinsurance, deductible does not apply | 40% coinsurance, deductible does not apply | |

| Common Medical Event | Services You May Need | Network Provider (You will pay the least) | Out-of-Network Provider (You will pay the most) | Limitations Exceptions, & Other Important Information |
|---|---|---|---|---|
| If you visit a health care provider's office or clinic | Primary care visit to treat an injury or illness | $25 copay/office visit and $10 copay/virtual care visit; deductible does not apply | Not covered | No charge for virtual care visit with CirrusMD. |
| | Specialist visit | $50 copay/office visit, $10 copay/virtual care visit; $45 copay/ hearing exam visit; deductible does not apply | Not covered | Office visits by naturopaths, acupuncturists and chiropractors are specialist visits. No charge for virtual care visit with CirrusMD. Spinal manipulation, acupuncture care and naturopathic substances are not covered. |
| | Preventive care/ screening/ immunizati on | No charge for most services, $25 copay/ visit, deductible does not apply or 25% coinsurance for remaining services | Not covered | You may have to pay for services that aren't preventive. Ask your provider if the services needed are preventive. Then check what your plan will pay for. |
| If you have a test | Diagnostic test (x-ray blood work) | 25% coinsurance | Not covered | Includes other tests such as EKG, allergy testing and sleep study. |
| | Imaging (CT/PET scans, MRIs) | 25% coinsurance | Not covered | Prior authorization is required for many services. Failure to get prior authorization results in denial. |

| Services You May Need | Network Provider (You will pay the least) | Out-of-Network Provider (You will pay the most) |
|---|---|---|
| Primary care visit to treat an injury or illness | $25 copay/office visit and $20 copay/virtual care visit; deductible does not apply | Not covered |
| Specialist visit | $50 copay/office visit, $10 copay/virtual care visit; $45 copay/hearing exam visit; deductive does not apply | Not covered |
| Preventive care/screening/ immunication | No charge for most services. $25 copay/visit, deductible does not apply of 25% coinsurance for remaining services | Not covered |
| Diagnostic text (x-ray, blood work) | 25% coinsurance | Not covered |
| Imaging (CT/PET scans, MRIs | 25% coinsurance | Not covered |

616

| Identifier | Content |
|---|---|
| Primary care visit to treat an injury or illness | Network Provider (You will pay the least): $25 copay/office visit and $10 copay/virtual care visit, deductible does not apply. Out-of-Network Provider (You will pay the most): Not covered |
| Specialist visit | Network Provider (You will pay the least): $50 copay/office visit, $10 copay/virtual care visit, $45 copay/hearing exam visit, deductible does not apply. Out-of-Network Provider (You will pay the most): Not covered |
| Preventive care/screening/immunization | Network Provider (You will pay the least): No charge for most services, $25 copay/visit, deductible does not apply or 25% coinsurance for remaining services. Out-of-Network Provider (You will pay the most): Not covered |
| Diagnostic test (x-ray, blood work) | Network Provider (You will pay the least): 25% coinsurance. Out-of-Network Provider (You will pay the most): Not covered |
| Imaging/CT/PET scans, MRIs | Network Provider (You will pay the least): 25% coinsurance. Out-of-Network Provider (You will pay the most): Not covered |

| Identifier | Content |
|---|---|
| Primary care visit to treat an injury or illness | Network Provider (You will pay the least): $25 copay/office visit and $10 copay/virtual care visit, deductible does not apply. Out-of-Network Provider (You will pay the most): Not covered |
| Specialist visit | Network Provider (You will pay the least): $50 copay/office visit, $10 copay/virtual care visit, $45 copay/hearing exam visit, deductible does not apply. Out-of-Network Provider (You will pay the most): Not covered |
| Preventative care/screening/ immunization | Network Provider (You will pay the least): No charge for most services, $25 copay/visit, deductible does not apply or 25% coinsurance for remaining services. Out-of-Network Provider (You will pay the most): Not covered |
| Diagnostic test (x-ray, blood work) | Network Provider (You will pay the least): 25% coinsurance. Out-of-Network Provider (You will pay the most): Not covered |
| Imaging/CT/PET scans, MRIs | Network Provider (You will pay the least): 25% coinsurance. Out-of-Network Provider (You will pay the most): Not covered |

```
{       "modules":
        {
                "module_id":"abc-extraction",
                "output":
                {
                        "SPECIAL_VISIT_COINSURANCE":[
                                {
                                        "in_network":
                                                {
                                                        "value":"100%",
                                                        "text_coordinates":[ { } ],
                                                        "image_coordinates":[ { } ],
                                                        "page_no":["1"]
                                                        "probability:"  ":["1"]
                                                },
                                        "out-network":
                                                {
                                                        "value":"100%",
                                                        "text_coordinates":[ { } ],
                                                        "image_coordinates":[ { } ],
                                                        "page_no":["1"]
                                                        "probability":["1"]
                                                }
                                }
                        ],
                        "SPECIAL_CARE_VISIT_COPAY":[
                                {
                                        "in_network":
                                                {
                                                        "value":**,
                                                        "text_coordinates":[ { } ],
                                                        "image_coordinates":[ { } ],
                                                        "page_no":["1"]
                                                        "probability":["1"]
                                                },
                                        "out-network":
                                                {
                                                        "value":"100%",
                                                        "text_coordinates":[ { } ],
                                                        "image_coordinates":[ { } ],
                                                        "page_no":["1"]
                                                        "probability:"  ":["1"]
                                                }
                                        }
```

MULTIMODAL TABLE EXTRACTION AND SEMANTIC SEARCH IN A MACHINE LEARNING PLATFORM FOR STRUCTURING DATA IN ORGANIZATIONS

CROSS-REFERENCE TO RELATED APPLICATIONS

This application is a continuation of U.S. application Ser. No. 18/367,920, filed Sep. 13, 2023, which is a continuation-in-part of U.S. patent application Ser. No. 17/988,684, filed Nov. 16, 2022 (U.S. Pat. No. 11,842,286), which claims priority to U.S. Provisional Application No. 63/280,062, filed Nov. 16, 2021. These applications are incorporated herein by reference in their entireties and for all purposes.

BACKGROUND

Enterprise data processing systems can rely on machine learning techniques to generate insights into enterprise data. Machine learning refers to artificial intelligence technologies that train a computing system on how to learn. Input data can be sourced for machine learning applications from different computing systems, including legacy systems, and can include data in formats that are not designed for processing by machine learning applications.

BRIEF DESCRIPTION OF THE DRAWINGS

Detailed descriptions of implementations of the present invention will be described and explained through the use of the accompanying drawings.

FIGS. 6B-1 to 6B-3 show data transformation aspects of semantic search operations of an example machine learning platform according to some implementations of the disclosed technology.

FIG. 6C shows further data transformation aspects of semantic search operations of an example machine learning platform according to some implementations of the disclosed technology.

FIG. 6D shows example structured output of semantic search operations of an example machine learning platform according to some implementations of the disclosed technology.

Figure 1:
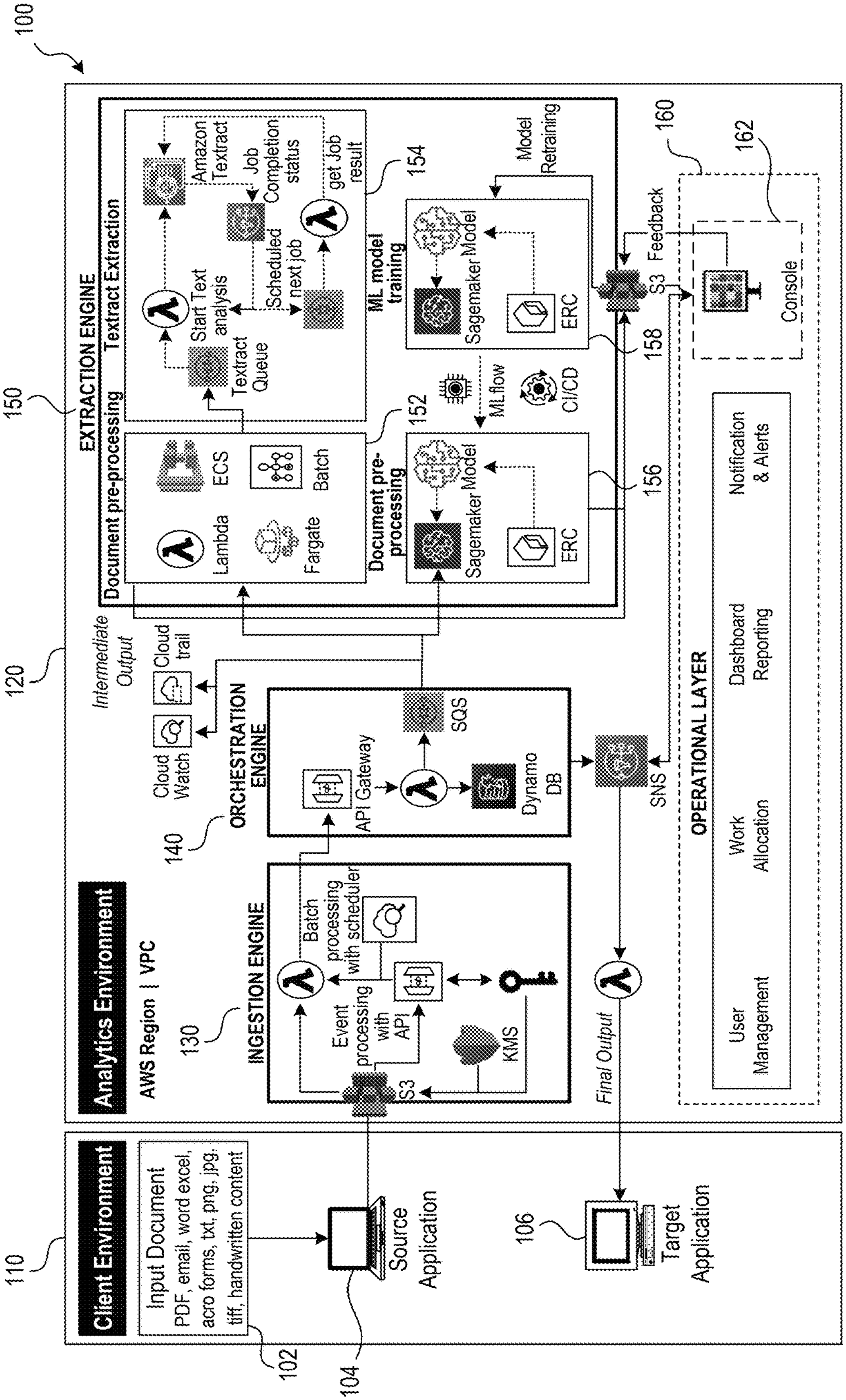
FIG. 1 is a block diagram showing an analytics environment included in the example machine learning platform according to some implementations of the disclosed technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As disclosed herein, a machine learning platform (also sometimes referred to herein as an analytics platform or artificial intelligence platform) can include an application instance made available to a subscriber entity in a cloud-based environment, such as, for example, in a virtual private cloud, via a virtual network, in a SaaS (software-as-a-service computing environment), PaaS (platform-as-a-service computing environment), and/or the like. The application instance can be maintained or managed, at least in part, by a provider of machine learning-based computing systems. The application instance can be communicatively coupled to a subscriber computing system.

The application instance can receive (e.g., access, retrieve, ingest), through a suitable communications interface, one or more documents from a subscriber computing system. For example, the subscriber computing system can generate or provide data regarding the subscriber entity's operations. The received documents can include structured elements, which can be individually addressable for effective use by machine learning models. However, the documents can also include semi-structured and/or unstructured data to which machine learning techniques cannot be readily applied. Unstructured data can include data in a format that is not capable of directly being processed by a machine learning model and can include images, health records, documents, books, journals, audio, video, metadata, analog data, and the like.

The machine learning platform disclosed herein can use source-agnostic machine learning models capable of extracting unstructured data across a plurality of input sources. The systems and methods disclosed herein solve the technical problem of using machine learning models on unstructured data by pre-processing unstructured data in a manner that optimizes inputs to machine learning models and standardizes data attributes across a diverse set of inputs. Advantageously, the analytics environment of the machine learning platform disclosed herein is data source and input data type agnostic.

Further, in some implementations, performance of machine learning models is improved by segmenting large, unstructured input documents such that the size of the pre-processed separate units input into the machine learning models can positively impact the relevant performance metrics of machine learning models. Such performance metrics can include, for example, classification accuracy, logarithmic loss, confusion matrix, area under curve, F1 score, mean absolute error, and/or mean square error.

Further, in some implementations, reference ontologies can be applied to input data to account for irregularities or errors in spelling. In an example use case, a predetermined accuracy threshold (e.g., 0.7, 0.8, 0.9) can be used to identity the top medication matches in the reference database to extract medication information from unstructured data. This approach has a technical advantage of improving model accuracy by identifying medication entities with a reasonable degree of accuracy even when irregulates in spelling are present.

In an implementation, the application instance can be structured to perform pre-processing operations on at least a portion of the received document and generate an optimized model input. The optimized model input can include, for example, summary sentences, key-value pairs extracted from unstructured data, and/or the like. The optimized model input can be generated using a pre-processing machine learning model, which can be or include a convolutional neural network (CNN), a deep learning (DL) model, a translational model, a natural language processing (NLP) model, a computer vision-based model, and/or the like. Prior to generating the optimized model input, the machine learning platform can perform additional pre-processing operations, such as image quality enhancement, optical character recognition (OCR), segmentation of documents into units, form item extraction, and/or the like. The machine learning platform can perform the pre-processing operations using regular-expression based searches, named entity recognition, classification of input documents, by determining and applying relevant ontologies, and/or the like.

In some implementations, the systems and methods disclosed herein can facilitate multimodal data extraction of different types of data (e.g., images, text, tables) and/or semantic searches. For example, as part of performing multimodal data extraction, a machine learning platform can receive or retrieve an image file. The machine learning platform can detect one or more cells in a table included in the image file and extract data from the cells. In some implementations, the cells can be detected using a convolutional neural network (CNN)-based approach using a deep residual learning network (e.g., a suitable ResNet variant, such as ResNet-34, ResNet-50, ResNet-101, ResNet-152, VGGNet, GoogleNet, Inception, EfficientNet). In some implementations, the cells can be detected using another suitable machine-learning based architecture, such as a graph neural network (GNN), capsule neural network (CapsNet), and/or the like. The platform can store the extracted data in machine readable form (e.g., in tabular form, in comma separated form, in extended markup language (XML) form, and so on). In some implementations, the platform can perform a semantic data search on the extracted data stored in the machine readable form. For example, the platform can identify columns with entity information, standardize table content, identify context for at least some entities in the content, and extract entities from the processed text. Accordingly, the system provides a technical advantage of generating responses to natural-language queries regarding items in unstructured documents.

The machine learning platform can provide the generated optimized model input to one or more machine learning models structured to perform machine learning/artificial intelligence operations (ML/AI) on the input documents. The machine learning models can be pre-configured or configured at runtime of the application instance using, for example, a previously stored setting, a subscriber-defined runtime parameter, or a feature of the target application operated by the subscriber entity in a subscriber computing environment communicatively coupled to the machine learning platform. The configuration setting(s) can determine the type of machine learning model to be executed on a particular optimized model input data set and/or the type of output of the machine learning model. For example, the output can include data in a format suitable as input to the target application (e.g., according to an electronic messaging format accepted by the target application).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Machine Learning Platform for Structuring Data in Organizations

FIG. 1 is a block diagram showing an example machine learning platform 100. As a general overview, the machine learning platform 100 can enable entities, such as subscriber entities that operate client environments 110, to access and utilize configurable ML/AI functions on entity-provided data.

A subscriber entity can be an insurance company, a healthcare organization, a financial services organization, a professional services organization, or another service provider. The subscriber entity can be in a vendee-vendor, recipient-provider or similar business relationship with an entity that manages the machine learning platform 100. The machine learning platform 100 can receive subscriber-provided items (e.g., data, documents, interface messages, and/or the like), optimize the received items for processing, perform ML/AI operations on the optimized items, generate output according to a messaging standard suitable for the subscriber entity, and transmit the output to a target application 106 in the client environment 110.

The machine learning platform 100 can include dedicated and/or shared (multi-tenant) components and can be implemented, at least in part, as a virtual or cloud-based environment. For example, in some implementations, the machine learning platform 100 can include a subscriber-specific application instance, shown as the analytics environment 120. The analytics environment 120 can allow subscriber entities to execute computer-based code without provisioning or managing infrastructure, such as memory devices, processors, and the like. In some implementations, the computing resources needed for a particular computing operation can be assigned at runtime.

The machine learning platform 100 can include various engines. As used herein, the term "engine" refers to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like.

Some engines described herein can include machine learning models, which refer to computer-executable instructions, in compiled or executable form, structured to facilitate ML/AI operations. Machine learning models can include one or more convolutional neural networks (CNN), deep learning (DL) models, translational models, natural language processing (NLP) models, computer vision-based models, or any other suitable models for enabling the operations described herein. For instance, the machine learning models described herein can be structured and/or trained to perform various horizontal and/or domain-specific functions. Examples of horizontal functions include image redaction, text redaction, item classification (e.g., email classification), and the like. Examples of domain-specific functions include product tagging, medical records processing, insurance document processing, property records analysis, asset management, claims processing, license plate extraction, property damage inspection, first notice of loss (FNOL) processing, and the like.

The engines described herein can include accelerators, which can be or include computer-executable code for enhancing performance of machine learning models. The accelerators can include a document layout accelerator, an optical character recognition (OCR) accelerator, and/or an extractive summarizer, as described further herein. Accelerators can, for example, optimize inputs for machine learning operations, perform image quality correction, reduce the size of processing units by using pre-processing machine learning models and/or other techniques to intelligently segment data inputs, and/or the like. For instance, accelerators can be structured to identify document sections in long .pdf documents based on metadata extracted from various regions within a document.

As shown, the client environment 110 can include one or more computing entities, such as the source application 104 and/or the target application 106. The source application 104 can provide one or more items 102 to the analytics environment 120 of the machine learning platform 100. To that end, the analytics environment 120 can include an ingestion engine 130. The ingestion engine 130 can be structured to receive input items via a suitable method, such as via a user interface (e.g., by providing a GUI in an application available to a subscriber entity that allows a subscriber to enter or upload data), via an application programming interface (API), by using a file transfer protocol (e.g., SFTP), by accessing an upload directory in the file system, by accessing a storage infrastructure configured to allow the source application 104 to execute write operations and save items, and the like. In some implementations, the storage infrastructure can include physical items, such as servers, direct-attached storage (DAS) devices, storage area networks (SAN) and the like. In some implementations, the storage infrastructure can be a virtualized storage infrastructure that can include object stores, file stores and the like. In some implementations, the ingestion engine 130 can include event-driven programming components (e.g., one or more event listeners) that can coordinate the allocation of processing resources at runtime based on the size of the received input item submissions and/or other suitable parameters.

A particular analytics environment 120 can be configured to receive items from multiple source applications 104 associated with a particular subscriber entity. For example, a healthcare organization, acting as a subscriber, may wish to perform analytics on data generated by different systems, such as an electronic medical records (EMR) system, a pharmacy system, a lab information system (LIS), and the like. As shown, the analytics environment 120 can include an orchestration engine 140. The orchestration engine 130 can include an API gateway, which can be structured to allow developers to create, publish, maintain, monitor, and secure different types of interface engines supported by different source applications 104. The interface engines can include, for example, REST interfaces, HTTP interfaces, WebSocket APIs, and/or the like. The orchestration engine 130 can manage interface engine operations, including error handling, routing, branching executables, and/or the like. The branching executables can include item routing logic to determine whether input items should be routed to a particular module within the extraction engine 150.

The extraction engine 150 is structured to perform pre-processing, extraction, inference, and ML/AI model training operations described herein. The extraction engine 150 can include a pre-processing engine 152, an extraction engine 154, a model inference engine 156, and/or a model training engine 158. The pre-processing engine 152 can perform pre-processing operations to generate optimized model input items. The pre-processing operations can include, for example, image quality correction, segmentation of data inputs, extractive summarization, identification of document regions and segmentation according to the identified regions, data type conversion, and the like. The extraction engine 154 can perform named entity recognition, segmentation, and other relevant operations on the pre-processed items in order to further structure the data items. The inference engine 156 can perform ML/AI operations on the optimized model input items received from the orchestration engine 140, pre-processing engine 152, and/or extraction engine 154.

The models included in the inference engine 156 can be trained using the training engine 158. In some implementations, training can be performed in an automatic fashion. For instance, a special-purpose virtualized MLOps server (MLflow) can connect to various artifact databases that can include model inputs, model outputs, model registries, and/or the like. The virtualized MLOps server can register various models included in the model inference engine 156, track performance of the models and outcomes of experiments, training sessions, and/or the like. In some implementations, the training can be performed with human intervention via the console 162.

The extraction engine 150 can ingest unstructured items and output structured and/or summarized items in the form of key-value pairs, datasets, tables, summary sentences and the like. The output can be transmitted to one or more target applications 106.

Figure 2:
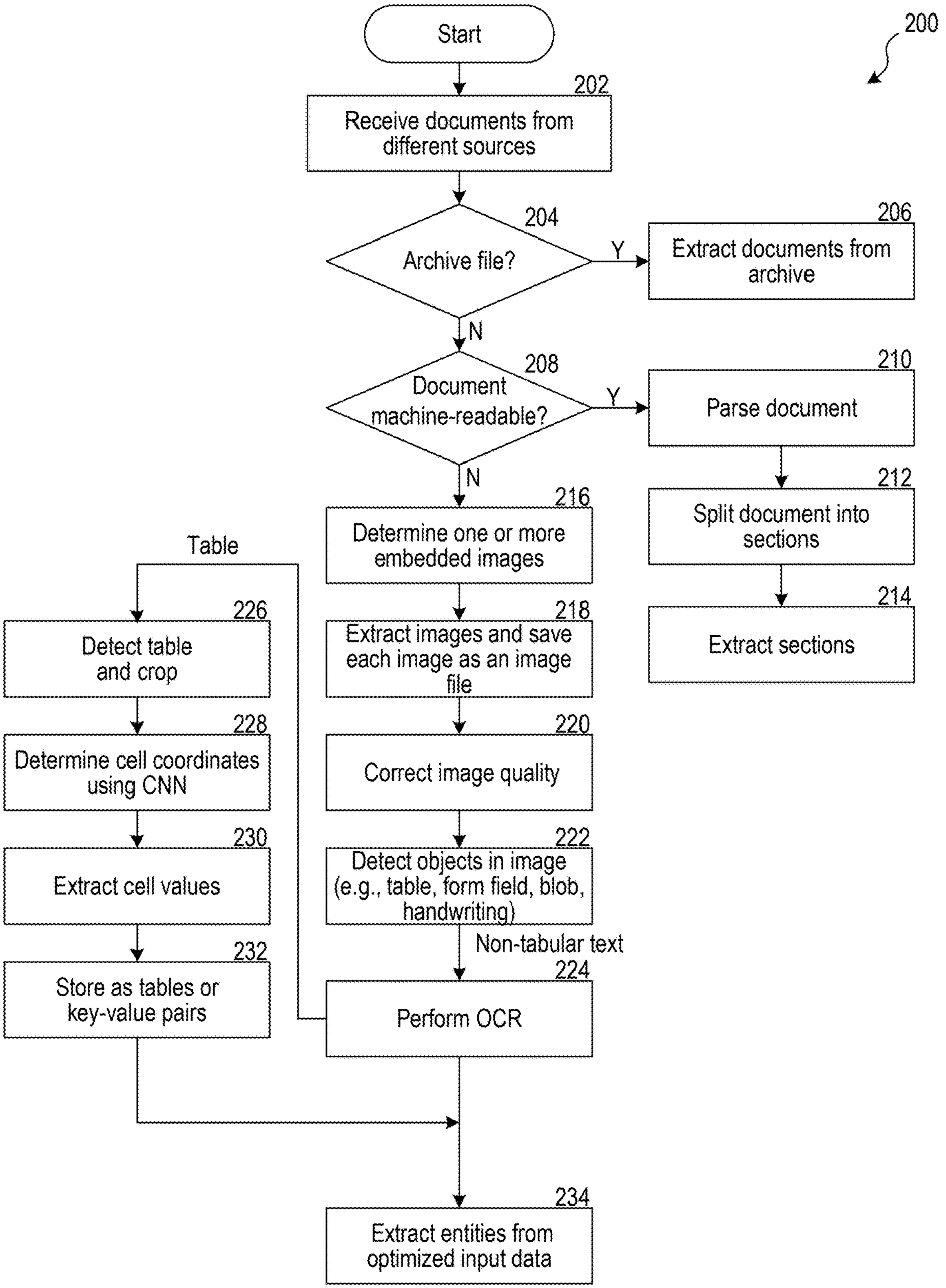
FIG. 2 is a flowchart showing data ingestion and pre-processing operations of an example machine learning platform according to some implementations of the disclosed technology.

Methods of Operation of a Machine Learning Platform for Structuring Data in Organizations FIG. 2 is a flowchart showing data ingestion and pre-processing operations 200 of an example machine learning platform. In an example implementation, operations 200 can be performed by the extraction engine 150 of the analytics environment 120 included in the machine learning platform 100 shown in FIG. 1. However, one of skill will appreciate that operations 200 can be performed, in whole or in part, on another suitable computing device. As a general overview, the operations 200 enable the extraction engine 150 to perform pre-processing of inputs in order to make the inputs suitable for use by machine learning models of the analytics environment 120. One of skill will appreciate that operations 200 can be performed iteratively for a plurality of input items, which can be grouped according to various criteria (e.g., by data source, by topic, by time window, by machine learning platform 100 instance, in a batch file submission).

In operation, at 202, the extraction engine 150 receives one or more input items. In some implementations, an input item is a document. More generally, an input item can include one or more computer files. At 204, the extraction engine 150 parses the file extension from the file name of the input item. At 206, the extraction engine 150 determines whether the file extension is indicative of a mixed-content file, a document archive, or the like and, if so, the extraction engine 150 extracts one or more documents from the corresponding item. As part of extracting one or more documents, the extraction engine 150 can invoke computer-executable code structured to perform specific operations for processing files of a particular type, indicated by the file extension, and save the extracted documents to a predetermined storage location. For example, if the file extension is .zip, .rar, or similar, the computer-executable code can perform document extraction and decompression operations from the corresponding archive. As another example, if the file extension is .eml, .msg or similar, the computer-executable code can traverse an object set in the corresponding email message, identify the attachment object collection, and save the files in the attachment object collection to a specified directory. As another example, if the file extension is .html or similar (indicative of the input item being a webpage), the computer-executable code can execute a web scraper and/or data locator script to identify encoded data (e.g., by parsing HTML opening and closing tags and determining corresponding data values), make requests to internal application programming interfaces (APIs) for associated data stored in a database and delivered to a browser via HTTP requests as indicated by HTML code, and the like.

At 208, the extraction engine 150 determines whether the document is machine-readable. In some implementations, the determination regarding whether the document is machine-readable can be made based on the file extension of the document (e.g., as shown at 210, extensions such as .pdf, .docx, etc. can indicate that a document is machine-readable). In some implementations, the determination is made via computer-executable code that scans the document to determine whether the entirety of the document is machine-readable (e.g., as shown at 216, the presence of an image in the document may indicate that the document is not machine-readable; as shown at 218, the document can contain more than one image that can be split for further processing; as shown in 220, image quality can be analyzed and various image enhancement operations applied).

When the extraction engine 150 determines that the document is machine-readable, then, at 212, the document can be split into relevant sections and, at 214, the detected sections can be extracted and fed into machine learning models as discrete, separate units, which can improve (e.g., increase a positive indicator, decrease a negative indicator) the processing efficiency and performance metrics of the machine learning models. The performance metrics can include, for example, classification accuracy, logarithmic loss, confusion matrix, area under curve, F1 score, mean absolute error, and/or mean square error. Accordingly, in some implementations, the size of the extracted separate units input into the machine learning models can be directly or inversely proportional to the corresponding performance metrics.

At 222-232, the extraction engine 150 can perform various other operations to optimize the input items for processing by machine learning models. For example, a document layout accelerator, at 222, can perform document layout analysis and detect special items. If a text blob is detected, an OCR accelerator can, at 224, perform optical character recognition on the corresponding objects. If tabulated data is detected, the document layout accelerator can detect, at 226, a particular table component and crop the detected table, as described, for example, in reference to FIGS. 5A-5E. As shown at 228, the document layout accelerator can include a pre-processing convolutional neural network trained to recognize table cells and their coordinates, as described, for example, in reference to FIGS. 5A-5E. The document layout accelerator can use a graph convolutional technique, at 230, or a logical locations-based technique to extract values from the tables, and, at 232, store the extracted values in structured form, such as Excel, JSON, another type of key-value pair, and/or the like, as described, for example, in reference to FIGS. 5A-5E.

As shown, the outputs of operations 214, 224, and/or 234 include pre-processed items optimized for inputting into machine learning models.

Figure 3A:
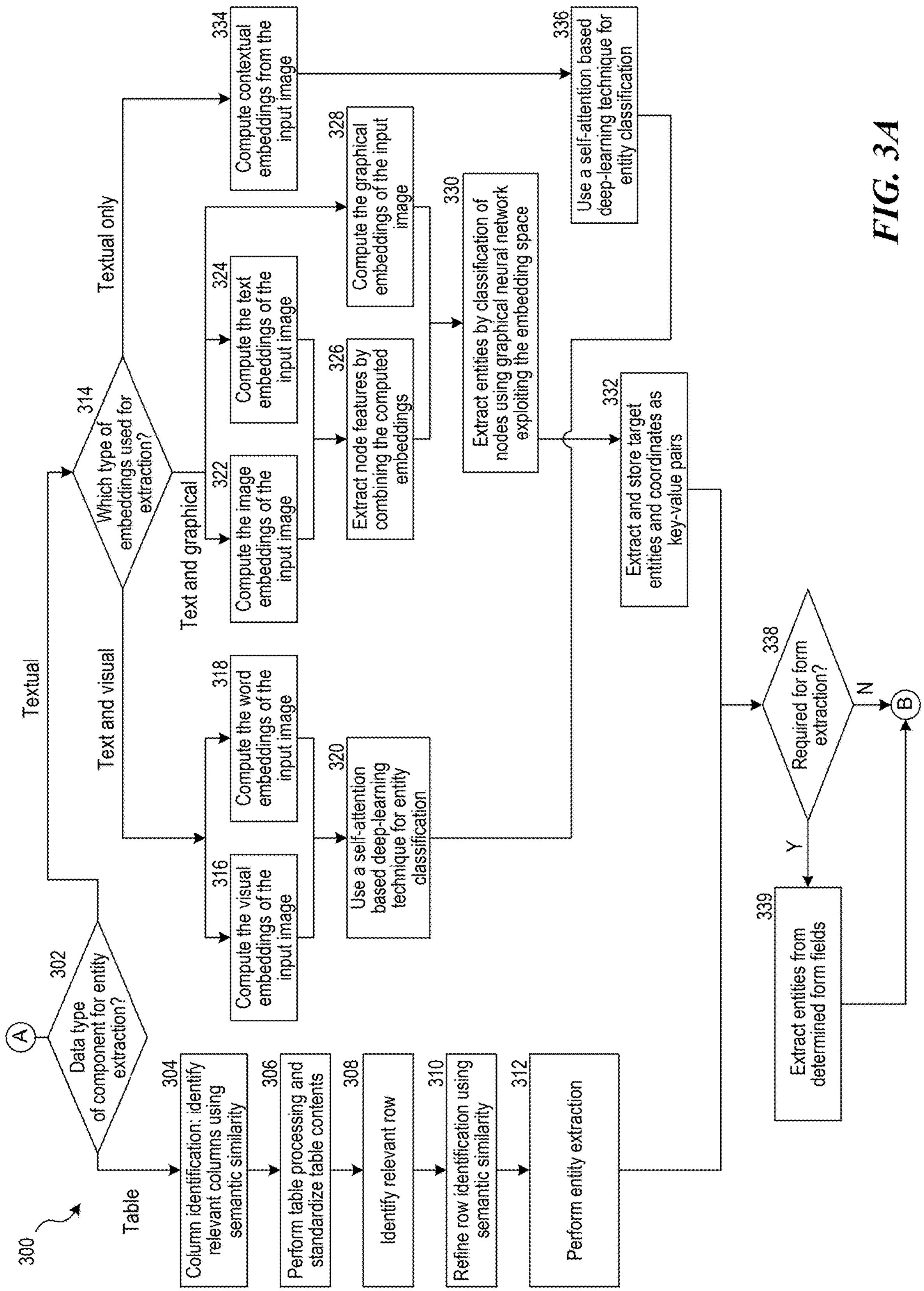
FIGS. 3A and 3B are flowcharts showing data extraction operations of an example machine learning platform according to some implementations of the disclosed technology.
Figure 3B:
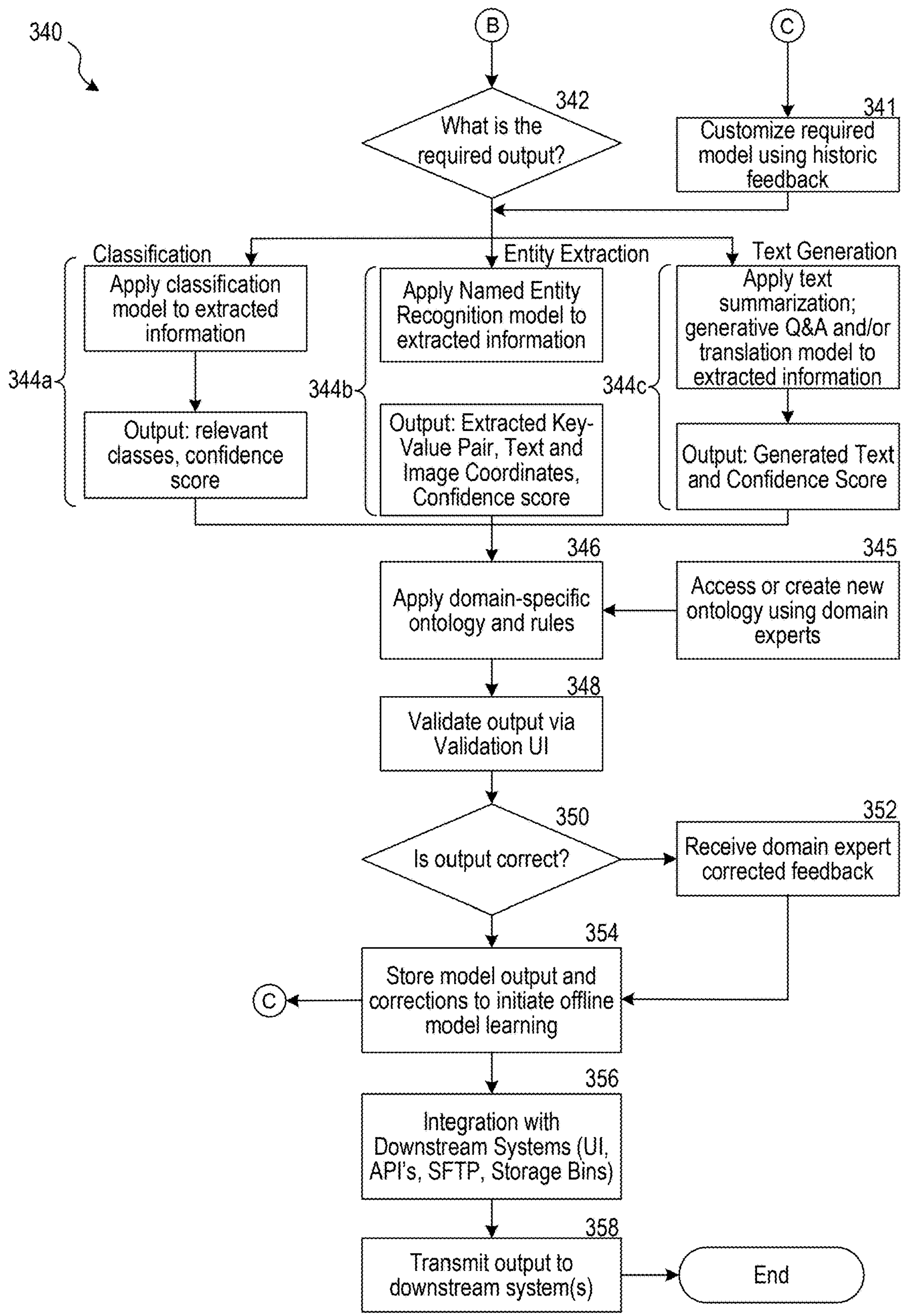

FIGS. 3A and 3B are flowcharts showing data extraction operations of the example machine learning platform. FIG. 3A shows pre-extraction optimization operations 300, and FIG. 3B shows data extraction operations 340 that can follow pre-extraction optimization operations 300 or use the output of method 200 of FIG. 2 or another suitable process. In an example implementation, operations 300 and/or 340 can be performed by the extraction engine 150 of the analytics environment 120 included in the machine learning platform 100 shown in FIG. 1. However, one of skill will appreciate that operations 300 and/or 340 can be performed, in whole or in part, on another suitable computing device. As a general overview, the operations 300 and/or 340 enable the extraction engine 150 to optimize and execute machine learning models of the analytics environment 120. One of skill will appreciate that operations 300 and/or 340 can be performed iteratively for a plurality of input items, which can be grouped according to various criteria (e.g., by data source, by topic, by time window, by machine learning platform 100 instance, in a batch file submission).

In operation, at 302, the extraction engine 150 can identify the component for entity extraction. The component can include a table, be a non-tabular item, or a combination of the above.

When the component is a table, the extraction engine 150 can perform operations at 304-312. For example, at 304, the extraction engine 150 identifies relevant columns using a suitable technique, such as semantic similarity, as described, for example, in reference to FIGS. 6A-6D. The relevant terms can be supplied using a domain-specific ontology. For instance, if a domain is insurance underwriting based on a patient's medical record, a table in an input document can contain both relevant and non-relevant information, and a list of synonyms can be maintained in the ontology for the system to reference in order to identify headers for relevant columns. For example, in the case of medication, the ontology can define medication quantity related items such as "dosage" and "units" to be equivalent based on the synonyms. In some implementations, the extraction engine 150 can traverse a set of column objects and compare column headers to items in the ontology. In some implementations, the extraction engine 150 can start with a predetermined list of items from the ontology and traverse the set of column headers to compare ontology items to column headers. In some implementations, the extraction engine 150 can parse items from the column headers or otherwise reduce the complexity of column headers prior to performing operations at 304.

At 306, the extraction engine 150 can standardize table content. For instance, the extraction engine 150 performs operations to identify that data values, data type, metadata, etc. across records (rows) are consistent for particular column types. For example, the extraction engine 150 confirms that no null values are present where non-null values are not allowed, that textual data is not present where numerical values are expected, and the like.

At 308, the extraction engine 150 can identify relevant rows, such as by using, at 310, semantic similarity techniques. For example, in a medical records use case, an input data structure can contain data for multiple patients. A case-specific ontology can be maintained or generated at run-time (e.g., to price an insurance policy for a particular patient) and stored in cache memory associated with a computing device on which the extraction engine 150 operates. The patient's name from the case-specific ontology can be used to extract the relevant rows from the table. In another example, each row can be converted into a single sentence and/or summarized.

At 312, the extraction engine 150 can proceed to entity extraction operations. For example, the extraction engine 150 can extract specific strings, tokens, items or values from the cells using regular expressions (a sequence of characters that specifies a search pattern in text), named entity recognition (e.g., identifying that a particular item, such as "John", is indicative of a particular type, such as "First Name"), and/or similar techniques.

If the component includes a non-tabular item, the extraction engine 150 can perform operations at 314-332. If the extraction engine 150 uses (at 314) textual embeddings along with the visual/image embeddings (at 316), the extraction engine 150 proceeds to calculate various feature vectors/embeddings such as visual/image (at 316) and word (at 318). A transformer-based deep learning model (at 320) can be applied to classify the entities into their corresponding identifiers and extract from the document.

If the extraction engine 150 uses (at 314) textual embeddings along with the graphical/relational embeddings (at 322), the extraction engine 150 proceeds to calculate various feature vectors/embeddings such as visual/image (at 322), word (at 324) and graphical/relational (at 328). Considering each word in the document as a node, the extraction engine 150 extracts the node features by combining the visual and word embeddings. A graph neural network model (at 330) can be applied to classify the nodes for extraction of entities by exploiting the embedding space (at 322, 324, 328).

If the extraction engine 150 uses (at 314) only textual embeddings, the extraction engine 150 proceeds to calculate contextual feature vectors/embeddings (at 334). A self-attention-based deep learning model (at 336) can be applied to classify the entities into their corresponding identifiers and extract from the document.

After extracting the entities, the extraction engine 150 can convert the entities and/or values to a structured format, such as Excel, JSON or another key-value data store (at 332). At 338-339, the extraction engine 150 can use the extracted entities for form extraction. For example, the extracted set of entities can be stored, at 339, in optimized fashion for form extraction. One of skill will appreciate, however, that storage and transmission of extracted entities at 338-339 is not limited to operations that require form extraction.

A set of operations 340, shown in FIG. 3B, can follow the pre-extraction optimization operations 300. The set of operations 340 can be performed by machine learning models, which can be trained, at 341, to improve accuracy, recall, and other performance parameters of the machine learning models. For example, at 341, the extraction engine 150 can generate performance metrics and/or other historical feedback for a particular machine learning model and store this data relationally to the inputs and/or outputs of the machine learning model. The stored data can be used to customize the respective model to improve its performance metrics.

At 342, the extraction engine 150 can determine the type of output needed, such as classification, entity extraction, and/or text generation. The type of output needed can be determined, for example, by pre-configured settings stored in association with a particular analytics environment 120, and/or at runtime. The type of output needed can be based on various factors, such as the application domain of the particular analytics environment 120 (e.g., medical records analytics, medication extraction from unstructured data, insurance underwriting, document redaction operations, etc.), user-specified parameters entered at runtime (e.g., via a user interface that allows a user to query unstructured input data), etc.

If the determined type of output is classification, then, at 344*a*, the extraction engine 150 can use a classification machine learning model to process the extracted items. The output of the classification machine learning model can include extracted data, classifiers, confidence scores, and the like. In some implementations, classification can be performed by a machine learning model trained to perform inferential extraction on document content (e.g., where the extracted item is document content). The machine learning model can be implemented as an NLP model, computer vision based model, and/or the like. For example, an NLP model can be used to classify input documents that include emails, such as customer care emails. In another example, an NLP model can be used to identify a part of an input document as a particular medical record type (e.g., using Longformer). In another example, an NLP model can be used to identify a part of an input document as a particular sub-section of the document. In another example, computer vision can be used to extract items from a document and provide these items to an NLP model for further segmentation and identification. Computer vision model can be trained to search for particular labels within a document—for example, where a document is a form document. The labels can include various invoice fields, such as any of a purchase order number, invoice number, order number, customer number, account number, sales representative, shipping method, currency, order type, ship date, order date, delivery date, invoice date, due date, terms, bill to, and/or remit to.

If the determined type of output is entity extraction, then, at 344*b*, the extraction engine 150 can use an entity recognition machine learning model to process the extracted items. The output of the entity recognition machine learning model can include data (e.g., extracted key-value pairs where a key can be an entity name and a value can correspond to the extracted data item), embedded item coordinates, confidence scores, and the like.

If the determined type of output is text generation, then, at 344*c*, the extraction engine 150 can use a text generation machine learning model to process the extracted items (e.g., by using extractive summarization). The output of the text generation machine learning model can include data (e.g., generated text, output of text summarization operations, and/or the like), confidence scores, and the like.

One of skill will appreciate that operations at 344*a*, 344*b*, and/or 344*c* are not mutually exclusive and can be performed in combination or in sequence in any order. For instance, text generation operations can be performed using classified data and/or named entities. For example, the extraction engine 150 can receive a medical report that may include form fields denoting basic information about a medical event (e.g., patient name, medical record number, date, provider). The extraction engine 150 can extract named entities from the form fields on the medical report. The extraction engine 150 can classify the document as a medical report based on the detecting a combination of form fields. The extraction engine 150 can extract codified information (e.g., diagnosis code, medication code) from a free-form narrative included in the report by determining text coordinates, applying a bounding box, performing OCR operations on the determined region, tokenizing (parsing) the text returned by the OCR operations, and applying an ontology to tokens in the text to identify a diagnosis, determine a corresponding diagnostic code, identify a medication, and determine a corresponding medication code. The extraction engine 150 can summarize the medical report by generating a sentence via extractive summarization or another suitable technique. The sentence can include the determined codes.

At 346, the extraction engine 150 can standardize the output of the machine learning models with the use of an ontology supplied at 345. At 348, the extraction engine 150 can transmit the output to a computing device, such as the console 162 of FIG. 1, for validation. The extraction engine 150 can generate a validation GUI and display the output in a result set rendered on the validation GUI. The validation GUI can include data input controls structured to allow validators to specify whether the output is correct. Responsive to accepting validator feedback at 348, the extraction engine 150 can make a determination, at 350, whether the output is indicated to be correct. If indicated incorrect, the extraction engine 150 can generate or update the GUI to allow the validator to submit feedback. In some implementations, the submitted feedback can be stored, at 354, in structured form (e.g., as a mapping between an incorrect value and an expected value, a mapping between an expected value and an input value) and provided to the model as training data.

At 356, the validated output can be provided to a downstream system, such as the target application 106 of FIG. 1.

Figure 3C:
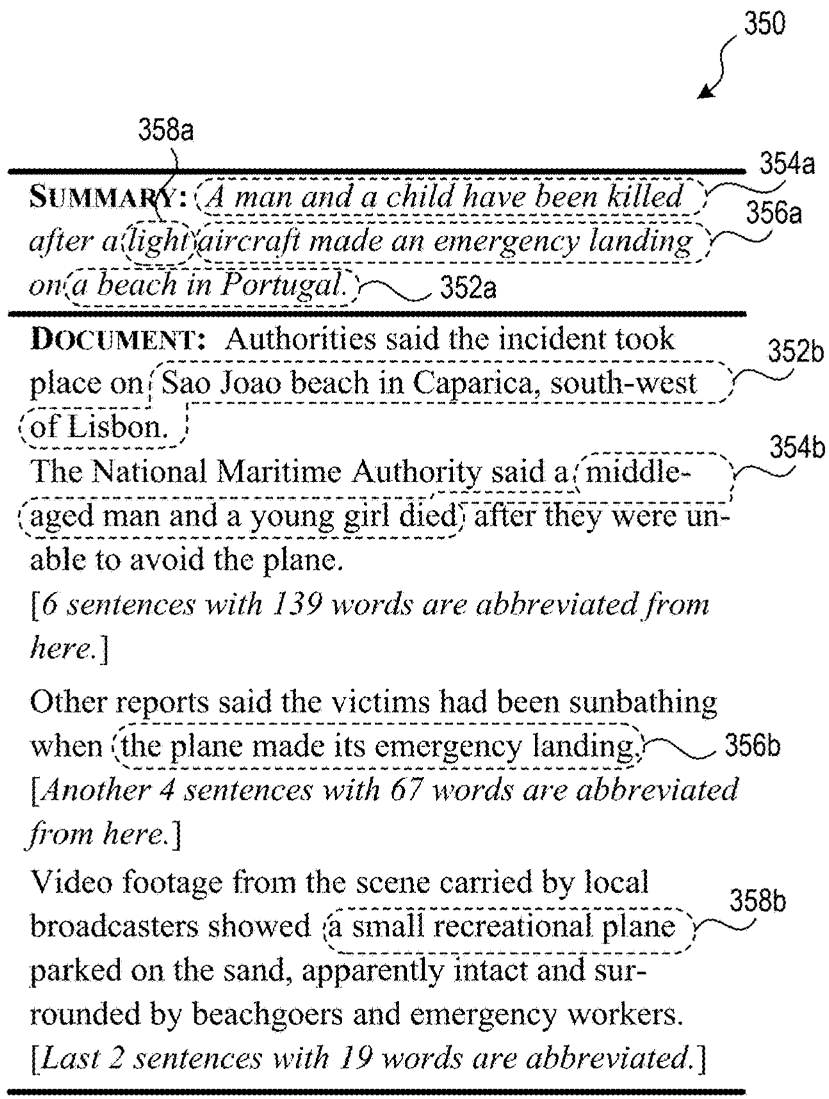
FIGS. 3C and 3D show extractive summarization operations of an example machine learning platform according to some implementations of the disclosed technology.
Figure 3D:
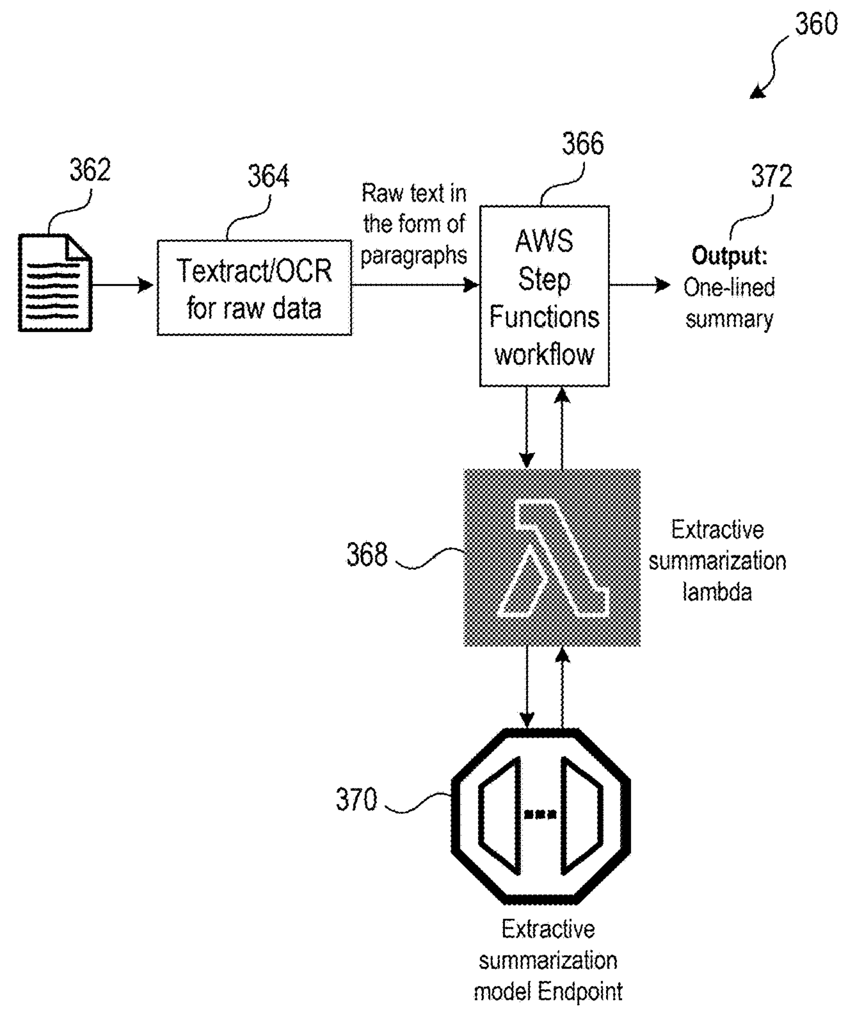

FIGS. 3C and 3D show extractive summarization operations of the example machine learning platform. In an example implementation, operations 360 of FIG. 3D can be performed by the extraction engine 150 of the analytics environment 120 included in the machine learning platform 100 shown in FIG. 1. However, one of skill will appreciate that operations 360 can be performed, in whole or in part, on another suitable computing device. As a general overview, automatic text summarization refers to the technique of generating short, fluent and coherent summaries from long documents such as news articles, meeting documents, lawsuits, scientific documents, clinical reports, etc. Extractive summarization aims at highlighting only main points from the documents, as determined via machine learning. Due to scarcity of time and space, it is beneficial to have automatic short summaries generated from such documents, such one-lined summaries that help in answering a question, “What is the article about?”. Further benefits of extractive summarization can include the ability to extract key information from public news articles, to produce insights such as trends and news spotlights, ability to classify documents by their key contents, ability to distill important information from long documents to empower solutions such as search, question and answer formats and decision support, ability to cluster documents by their relevant content, and ability to highlight key sentences in documents.

As shown, the generated document 350 includes a summary section generated using an input document, such as a text file, an image file, or a PDF file. A transformer-type machine learning model is implemented as an extractive summarizer accelerator 368 and is trained to generate a summary sentence that includes a plurality of summary tokens 352*a*-358*a*, where each summary token corresponds to a respective input token 352*b*-358*b* parsed from the body of the input document 362. The input tokens 352*b*-358*b*, or another suitable intermediate representation of the text to be summarized, can be determined from raw text generated using OCR operations 364. The raw text can be further parsed into paragraphs before being passed to the orchestrator 372. The input tokens 352*b*-358*b* can be assigned scores, and, based on the expected length of the generated summary sentence, top K sentences can be selected for the summary. Accordingly, the number of tokens in the sets 352*a*-358*a* and/or 352*b*-358*b* can correspond to the value of K (e.g., a suitable integer value that equals to or is greater than 1).

A user can provide the input document 362, receive the summary tokens 352*a*-358*a* and otherwise interact with the extractive summarizer accelerator 368 via the endpoint 370, which can include a URL generated for a particular instance of the analytics environment 120 and structured to serve as the entry point for a web service component of the extractive summarizer accelerator 368.

One of skill will appreciate that, in some implementations, extractive summarization can be performed iteratively—that is, summarized generated summary paragraphs or sentences can be further summarized through another iteration of the extractive summarization process.

Use Cases for a Machine Learning Platform for Structuring Data in Organizations

Figure 4A:
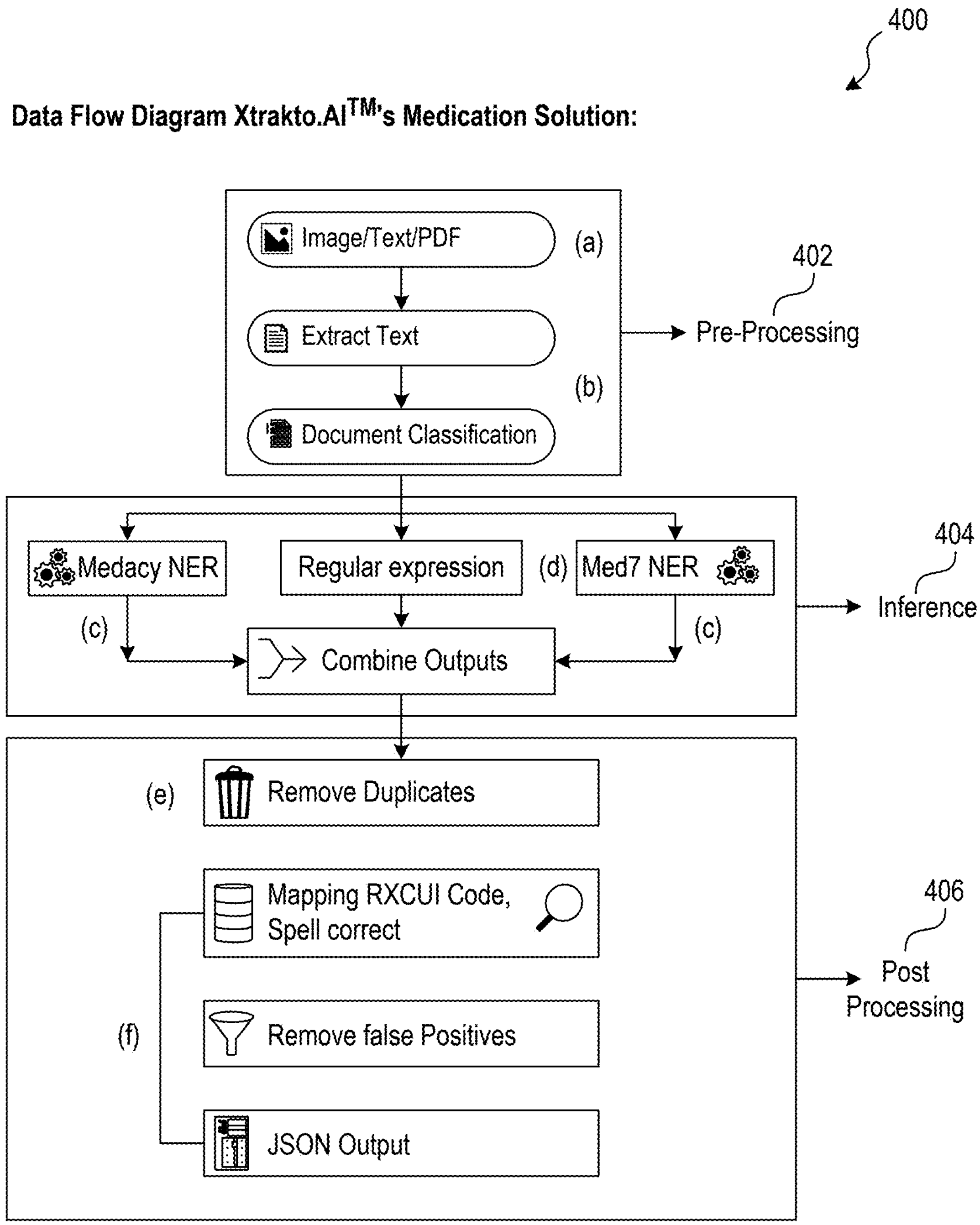
FIGS. 4A and 4B show operations and a graphical user interface (GUI) for extracting medication solution data in an example machine learning platform according to some implementations of the disclosed technology.
Figure 4B:
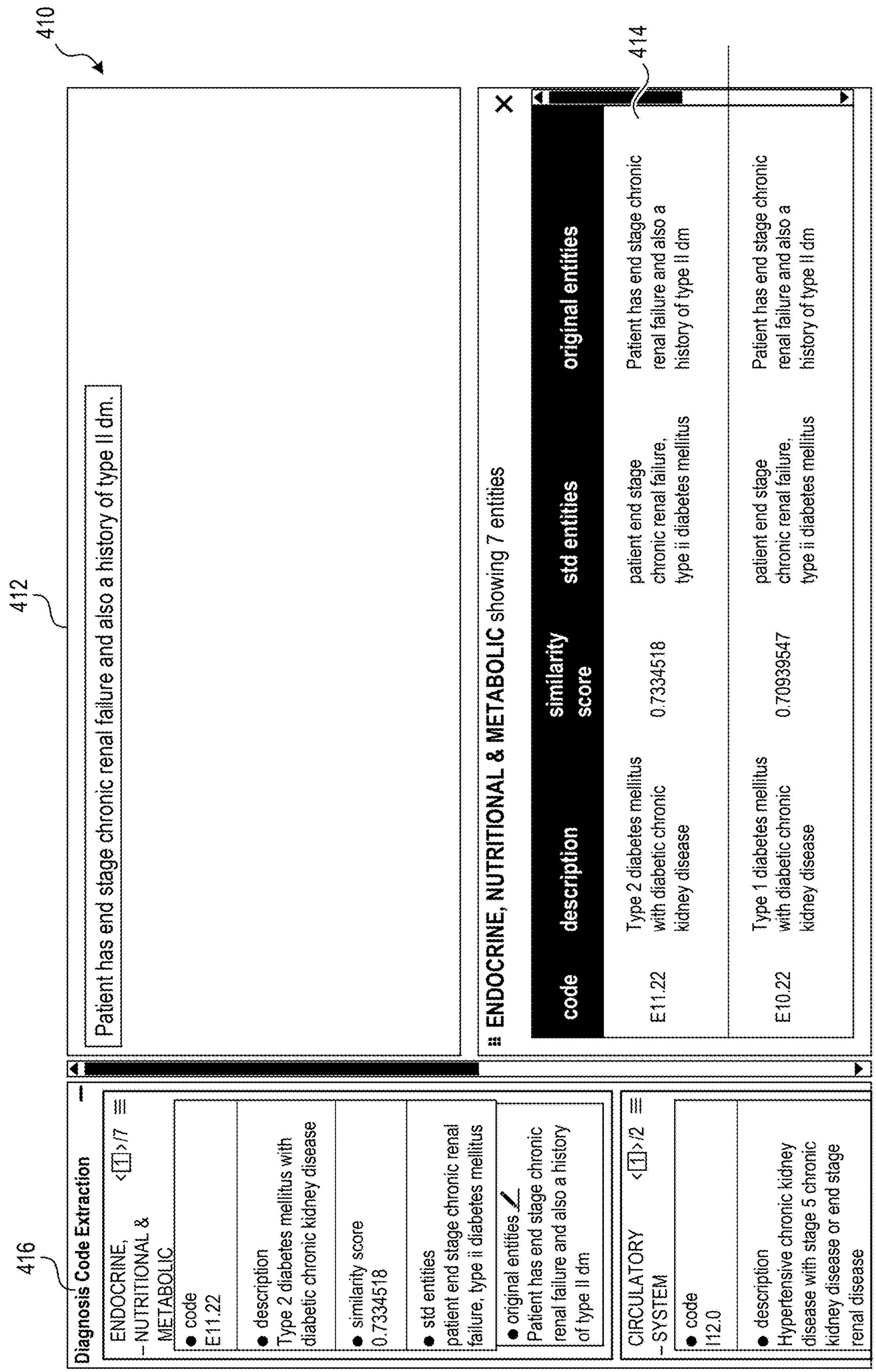

FIGS. 4A and 4B show operations and a graphical user interface (GUI) for extracting medication solution data in the example machine learning platform. In an example implementation, operations 400 of FIG. 4A can be performed by the extraction engine 150 of the analytics environment 120 included in the machine learning platform 100 shown in FIG. 1. However, one of skill will appreciate that operations 400 can be performed, in whole or in part, on another suitable computing device. As a general overview, medical documentation can include a wealth of unstructured data. Extracted medication information can be utilized in insurance claim settlement, risk adjustment, life and health underwriting, Attending Physician Statement (APS) assessment and summarization, and in other settings.

As shown in FIG. 4A, operations 400 can include pre-processing operations 402, inference operations 404, and/or post-processing operations 406. The GUI of FIG. 4B shows a corresponding validator user interface, where an input string 412 is shown relationally to the determined corresponding ontology entities 414. In some implementations, the determined ontology entities 414 can be assigned confidence scores, expected similarity scores, or similar metrics, which can improve over time as the model is trained on additional data. The ontology entity browser 416 can provide further information about each ontology entity.

In operation, as part of pre-processing operations 402, the extraction engine 150 can accept input data, such as the input string 412. Input to the model can be homogenous or heterogeneous, such as one or more of text, image, .pdf file, scanned document, and/or .tiff file. The input pre-processing can include special-purpose operations for extracting text from document images, arranging document in order, pre-processing skewed images, and so forth. An example pre-processing architecture can include named entity recognition models, such as Med7, Medacy, or another suitable open-source or proprietary model. The models can extract medication and related entities from the input file and classify them as drug name, dosage, strength, form, route, etc.

As part of inference operations 404, the extraction engine 150 can extract medication names using regular expressions. In some implementations, the extraction engine 150 can use an open-source or proprietary ontology that may include a dictionary of medication names. An example ontology can include any of a name of medical condition (e.g., "diabetes"), a severity category, a valid provider credential for treating the condition (e.g., one or more of "ACNP", "ANP", "APN", "ARNP", "CANP", "CFNP", "CNM", "CNP", "CRNA", "CCC-A", "CNS", "CRNA", "DC", "DO", "DPM", "FNP", "LCSW", "MD", "NP", "OD", "OT", "PA", "PA-C", "PT", "RNP", "APRN", "ACNS", "SLP", "Ph.D"), and so forth. An example ontology can include a type of an input document to which the ontology may apply, and machine learning models can be optimized to only consider the relevant input documents (e.g., consult notes, office visit summaries, annual wellness visits, operative reports, etc.) for applying the ontology. An example ontology can include a one-to-many mapping of diagnostic codes to keywords. For example, a particular diagnostic code ("E11.311"—"Type 2 diabetes mellitus with unspecified diabetic retinopathy with macular edema") can be mapped to a plurality of synonyms to optimize the semantic similarity techniques used by the machine learning models. An example ontology can include a prioritized list of sections in a particular medical document, such that synonyms found in different sections are assigned different weights or accuracy scores that correspond to a likelihood that a particular item in a document corresponds to the specified diagnostic code. For example, if the machine learning model encounters the synonyms in the chief complaint section of the document, the relative expected accuracy can be higher than when the term is encountered in the medical history section. An example ontology can include a list of condition-specific keywords. An example ontology can include respective medications, procedures, surgical treatment, diagnostic procedures, lab value ranges, and so forth.

As part of post-processing operations 406, the extraction engine 150 can determine medication-related entities in the input document and identify a corresponding medication code (e.g., an RxCUI code) for the medication-related entity. In an example implementation, extracted medication entities are matched with medication names in a reference database, such as the RxNorm database available at nih.gov. The matching can be performed using a suitable technique. For instance, one example implementation used the SequenceMatcher function of the difflib library, which uses the Levenshtein distance technique to match two strings and provide a match score. A predetermined accuracy threshold (e.g., 0.7, 0.8, 0.9) can be used to identity the top medication matches in the reference database. This approach has a technical advantage of improving model accuracy by identifying medication entities with a reasonable degree of accuracy even when irregulates in spelling are present. In some implementations, post-processing operations at 406 can include operations to pass entities through a spell checker module to fix spelling issues by, for example, referencing the relevant ontology. In some implementations, post-processing operations at 406 can include operations to map spell-corrected medication entities to fetch corresponding RxCUI codes. In some implementations, post-processing operations at 406 can include operations to generate output in a key-value format (e.g., JSON).

Object Marking and Output Validation Operations

Figure 4C:
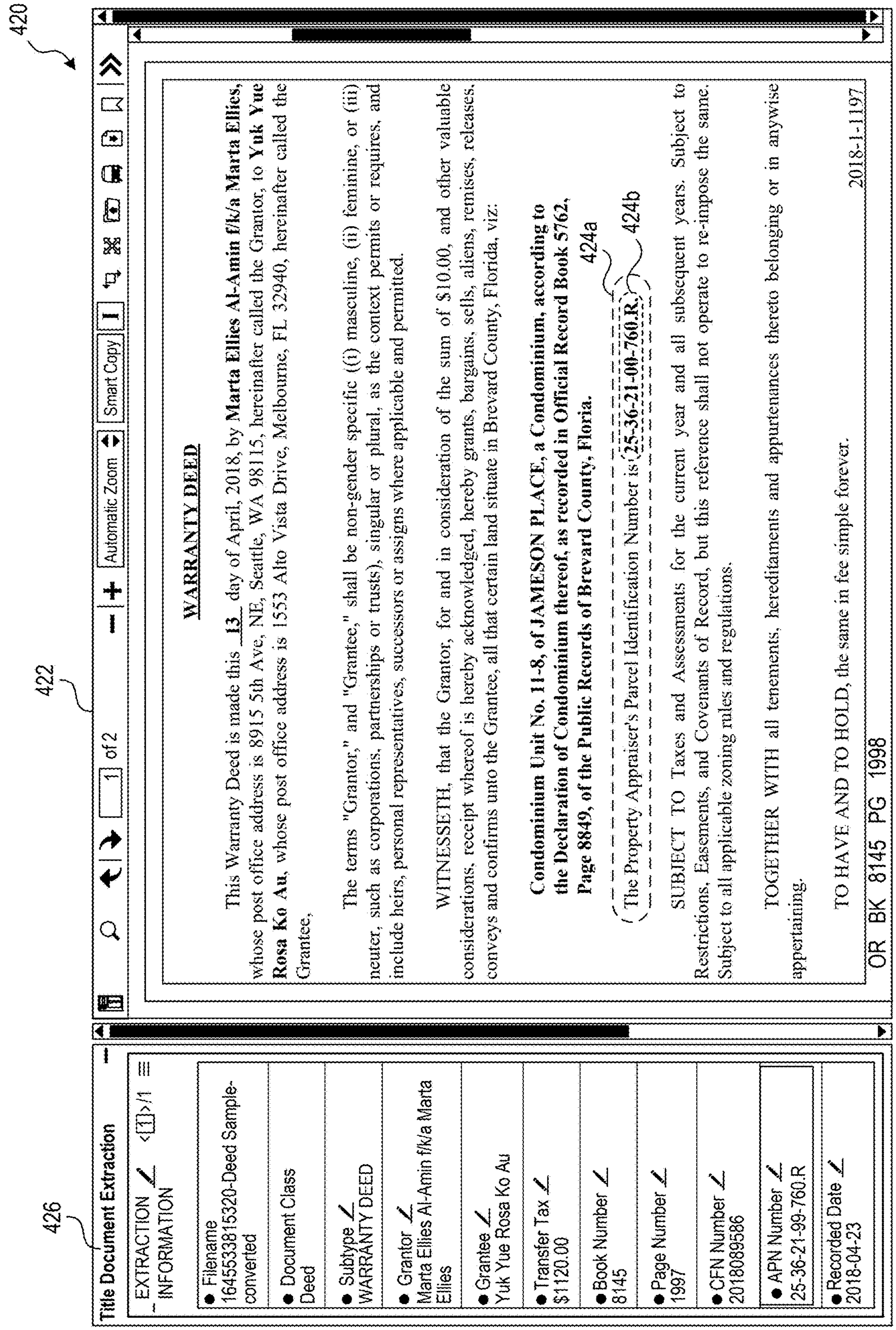
FIG. 4C shows a GUI for extracting property title information in an example machine learning platform according to some implementations of the disclosed technology.

FIG. 4C shows a GUI for extracting property title information in the example machine learning platform. As a general overview, real property records can include a wealth of unstructured data. Extracted property information can be utilized in insurance claim settlement, risk adjustment, to facilitate transactions, and in other settings.

The GUI of FIG. 4C shows a validator user interface 420, where an input string 424*a* is shown relationally to an example determined entity 424*b* identified using named entity recognition or another suitable technique. In some implementations, the determined entities 424*b* can be assigned confidence scores, expected similarity scores, or similar metrics, which can improve over time as the model is trained on additional data. The entity browser 426 can provide further information about each determined entity. As shown, the input document 422 can include a plurality of determined entities identified using a suitable machine learning technique.

Multimodal Extraction Operations

Figure 5A:
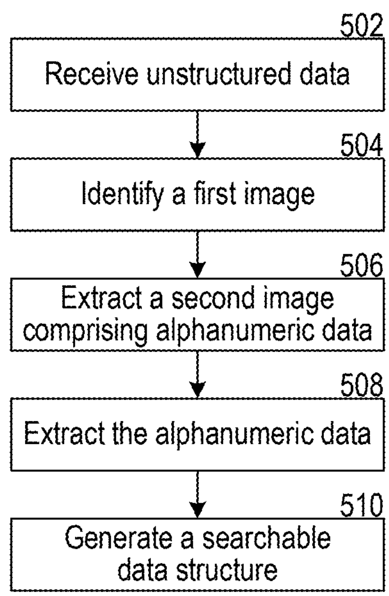
FIG. 5A is a flowchart showing multimodal data extraction operations of an example machine learning platform according to some implementations of the disclosed technology.

FIG. 5A is a flowchart that shows multimodal data extraction operations of an example machine learning platform according to some implementations of the disclosed technology. In an example implementation, operations of FIG. 5A can be performed by the extraction engine 150 of the analytics environment 120 included in the machine learning platform 100 shown in FIG. 1. However, one of skill will appreciate that the operations can be performed, in whole or in part, on another suitable computing device. As a general overview, the operations of FIG. 5A enable the extraction engine 150 to ingest an image-based document, detect positioning of various items within the image-based document, and generate a searchable data structure that can include one or more of the extracted data items. In some implementations, the operations can be performed iteratively for a plurality of input items, which can be grouped according to various criteria (e.g., by data source, by topic, by time window, by machine learning platform 100 instance, in a batch file submission).

In operation, at 502, the extraction engine 150 can receive, retrieve or otherwise access unstructured data. The unstructured data can include a variety of input items, which can be organized according to a variety of formats. For example, the unstructured data can include form documents (e.g., patient intake forms, insurance claims). In some implementations, the unstructured data can include one or more formatted or unformatted tables, which can present data in matrix form (e.g., as a set of rows and columns). The tables can include merged cells, headers, sub-headers, comments, annotations, and/or other items that ordinarily make the tables unsuitable as direct inputs to data extraction algorithms. Furthermore, the tables can include data of various data types (e.g., text, numbers, special characters, symbols, and/or the like). In some implementations, tables can be included in images.

The received unstructured data can include one or more images. In some implementations, the received unstructured data can be a single input image. The extraction engine 150 can use a suitable computer vision and/or object recognition technique to detect one or more regions of interest in the input image. For example, the input image can be a medical form that can include a patient information table (e.g., name, height, weight, blood pressure), a diagnostic code table (e.g., a diagnosis code and a corresponding description), and/or a narrative section. The extraction engine can automatically segment the input image into corresponding sections and perform operations 504-510 for each of the segmented sections.

At 504, the extraction engine 150 can identify the target first image in a particular extracted section. For example, the first image can include the image of interest which can be identified using machine learning or rule-based techniques.

At 506, the extraction engine 150 can use an optical character recognizer to calculate coordinates or otherwise determine positioning for bounding boxes around the region of interest to identify a second image. The second image can be an entity that includes textual, image and/or graphical embeddings, and or it can be a table. In case of tabulated data, one or more of pre-trained models (e.g., DETR) can be fine-tuned to extract the second image (ROI). Rules can be applied to improve the degree to which the bounding box accurately identifies the second image. For example, the rules can be contextual rules selected based on a detected type of input document (e.g., visit discharge summary, claim form, etc.).

At 508, the extraction engine 150 can extract alphanumeric data from the second image. The alphanumeric data can be structured in tabular form and/or can include textual, graphical or image embeddings extracted from the image. If the second image is or includes a table with a plurality of cells, the extraction engine 150 can use a convolutional neural network (CNN) or another a deep residual learning to detect the cells. To detect the cells, in an example implementation, a convolutional neural network-based approach (e.g., with resnet50 or a similar technology as the backbone) can be employed. In an example implementation, the fully convolutional component exploits the interdependence between the twin tasks of table detection and table structure recognition to segment out the table and column. The component uses enriched features that encode row and column information (frow and fcol). The component generates bounding boxes according to the spatial location which can be fed to either a graph-based engine or a rule-based engine to obtain corresponding logical location. If using a rule-based approach, text output from OCR can be assigned (e.g., bound to, associated with) to the predicted cell boxes according to the spatial location. In some embodiments, can be used to identify or predict the location of the text elements and their corresponding bounding boxes for cells within a table.

Accordingly, the extraction engine 150 can generate and apply a plurality of bounding boxes to each of the cells and extract alphanumeric data from the cells. In some implementations, the bounding boxes are applied based on the determined pixel positions of cell boundaries. Further aspects and implementations of table extraction are described in reference to FIG. 5B. If it is determined (e.g., by the extraction engine 150) that the second image contains specific form entities such as invoice number, total, address, the extraction engine can extract textual, visual, and/or graphical embeddings as described further in relation to FIGS. 5D and 5E.

At 510, the extraction engine 150 can generate a searchable data structure using the extracted data. An example of a searchable data structure is shown in FIG. 6E. However, one of skill will appreciate that other variants can exist. In the searchable data structure, the extracted data can be organized in a keyed (indexed) fashion, with each extracted data element capable of being referenced using a unique associated label, position, and/or the like. For example, if the searchable data structure is a database table, an Excel table, or the like, the data can be referenced using a combination of row and column values. As another example, if the searchable data structure is a JSON file, an XML file, and interface message, and/or the like, the searchable data can be referenced by a key, tag, and/or label in a key-value pair.

Figure 5B:
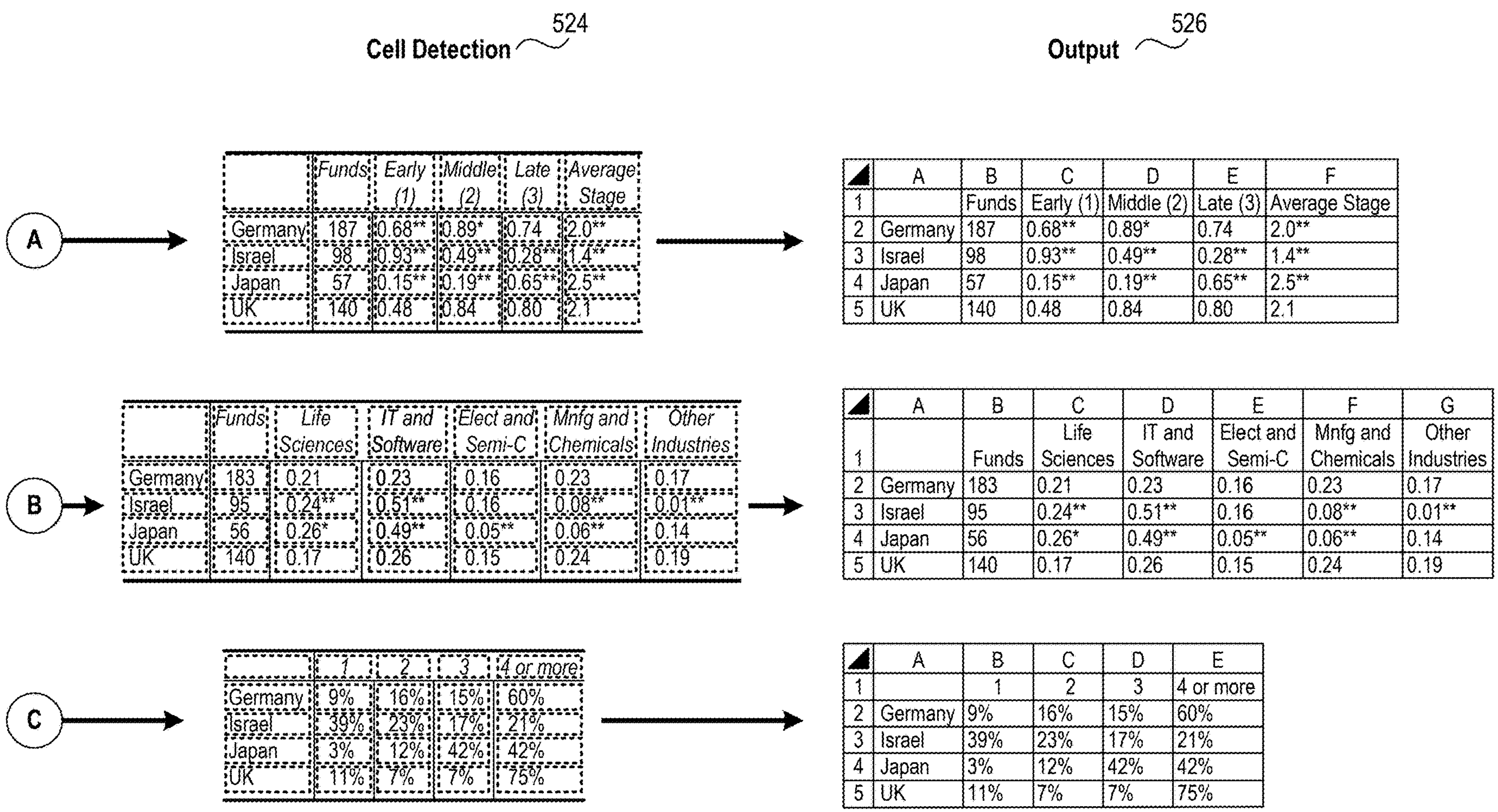
FIG. 5B shows CNN-based aspects of multimodal table extraction operations of an example machine learning platform according to some implementations of the disclosed technology.
Figure 5C:
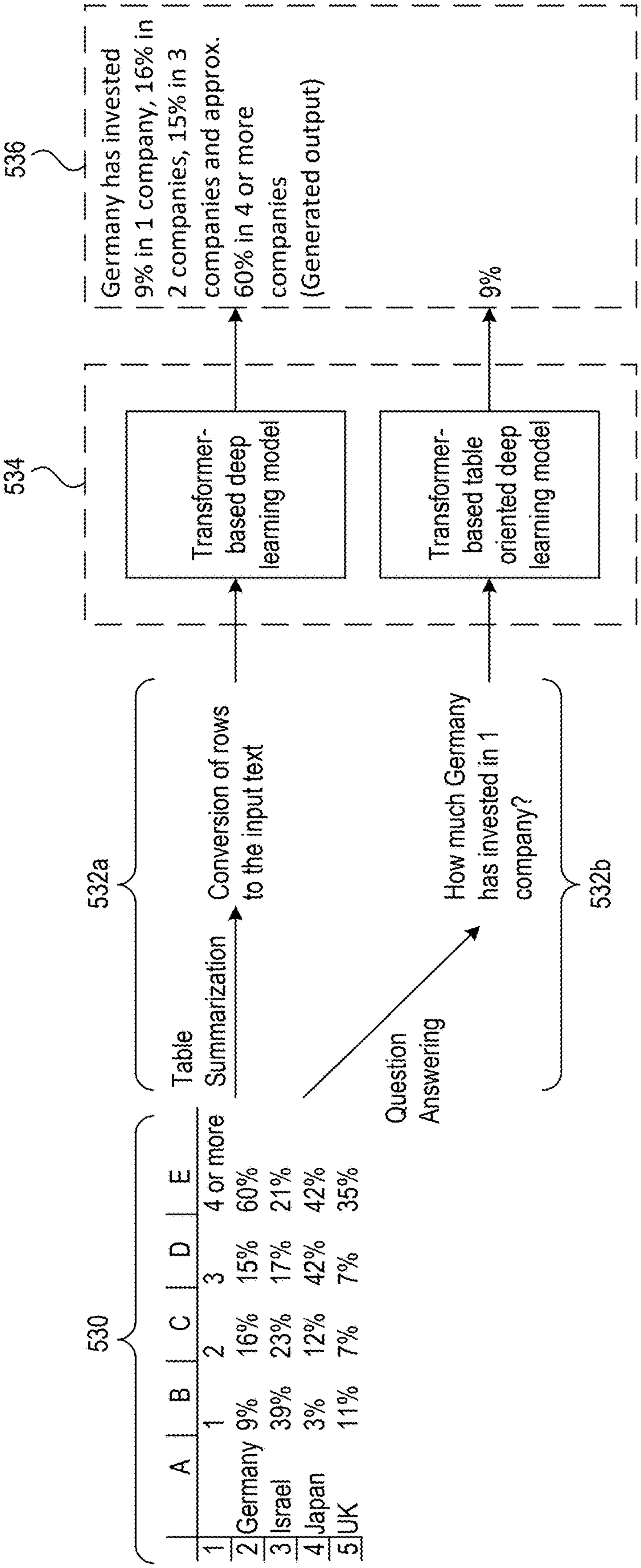
FIG. 5C shows further aspects of multimodal table extraction operations of an example machine learning platform according to some implementations of the disclosed technology.

According to various implementations, a machine learning model can be used on the searchable data structure to extract further information from the searchable data structure and/or apply table-to-text summarization to generate summary from the table, as described, for example, in reference to FIG. 5C (i.e., to generate query responses). In some implementations, the searchable data structure can be one of a set of searchable data structures, which can be combined to determine contextual information and answer to a query using semantic search operations, as described, for example, in reference to FIGS. 6A-6D.

FIG. 5B shows CNN-based aspects of multimodal table extraction operations of an example machine learning platform according to some implementations of the disclosed technology. Table extraction allows for data pre-processing such that data can be used in suitable form as an input to a conversational AI model trained to provide answers to queries. As shown, an input image 520 can include a number of regions, which can be parsed out as items 522. As shown, a region can correspond to a table. The tables across regions can have varying number of columns, number of rows, data types, data values, and/or the like, and a trained machine learning model can be used, alone or in conjunction with additional contextual information, to determine the type of entity included in the table. A cell detection model can extract a plurality of cells 524 from each table. Searchable output 526 (e.g., in tabular form) can be generated based on data parsed from the extracted cells 524.

FIG. 5C shows further aspects of multimodal table extraction operations of an example machine learning platform according to some implementations of the disclosed technology. As shown, structured data generated based on unstructured documents, ordinarily not suitable for processing by conversational AI models, can be used to generate natural-language responses to queries and to generate insights based on the structured data. As shown according to an example use case, the input image 520 of FIG. 5B can be an article that presents information in unstructured form.

Continuing the example of FIG. 5B, after structured output data 530 is generated based on detected textual elements in the article, the platform can enable further machine learning based analytics on the extracted data. In some implementations, a starting point for the machine learning based analytics is a query. The query can be received from an end user via a suitable user interface (e.g., by enabling a user to speak a question and converting the captured audio to text, by enabling a user to type a question, by enabling a user to select from a list of questions, etc.). The query can be parsed to determine whether a single reference value (row/column) or a combination of reference values (rows/columns) in the generated structured data are minimally sufficient to generate a response. If multiple rows/columns are minimally sufficient, table summarization 531*a* can be used. For example, a transformer-based deep learning model 534 can be applied to the subset of sells determined to be minimally sufficient to answer the query to generate a response 536. If a single row is minimally sufficient, the question answering engine 532*b* can apply another transformer-based deep learning model to generate a response 536 based on the determined value of a particular cell determined to be minimally sufficient to generate a response. In some implementations, generating a response 536 can include generating a natural language sentence.

Figure 5D:
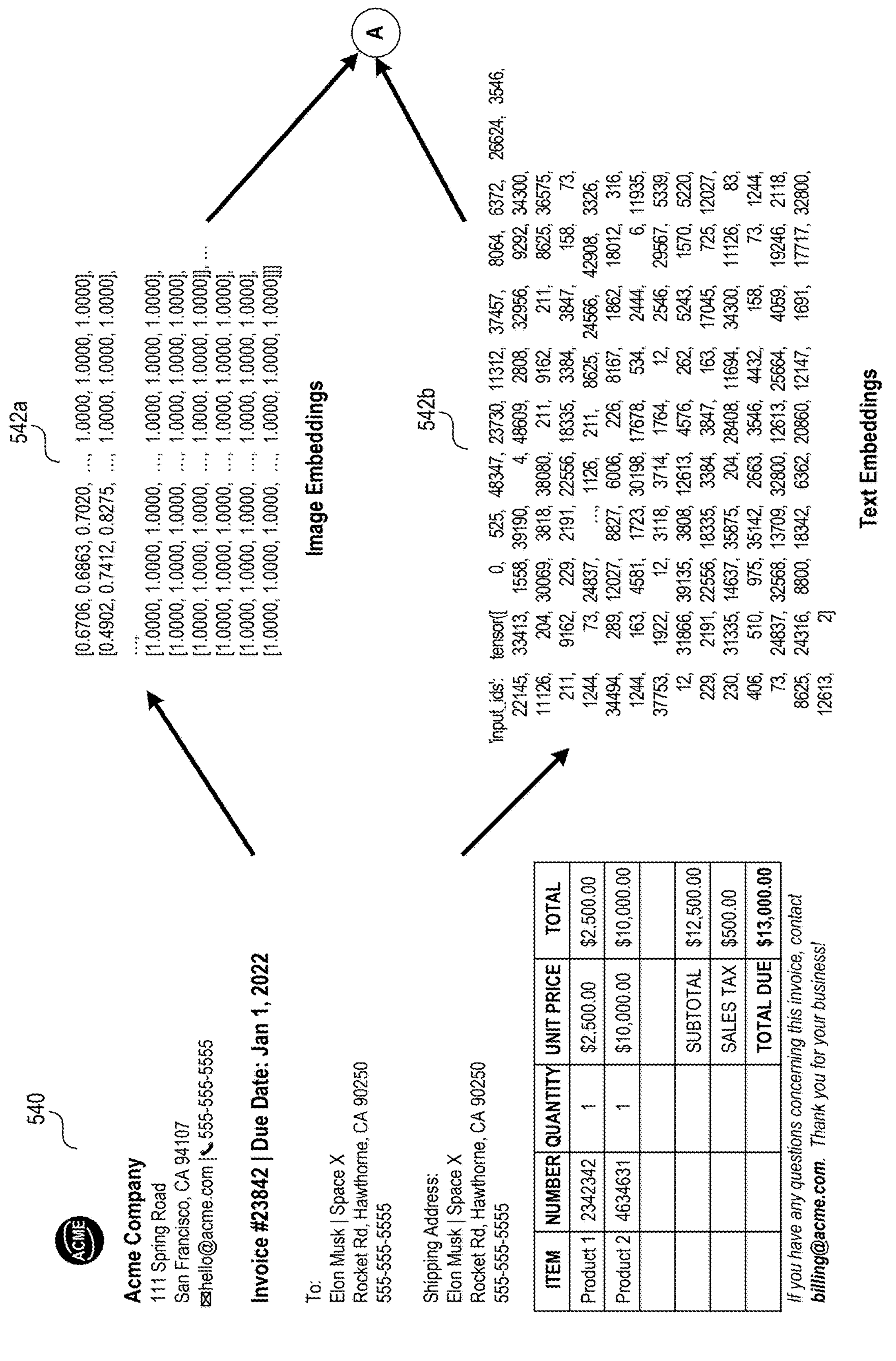
FIG. 5D shows global value extraction operations from mixed-type entities of an example machine learning platform according to some implementations of the disclosed technology.
Figure 5D:
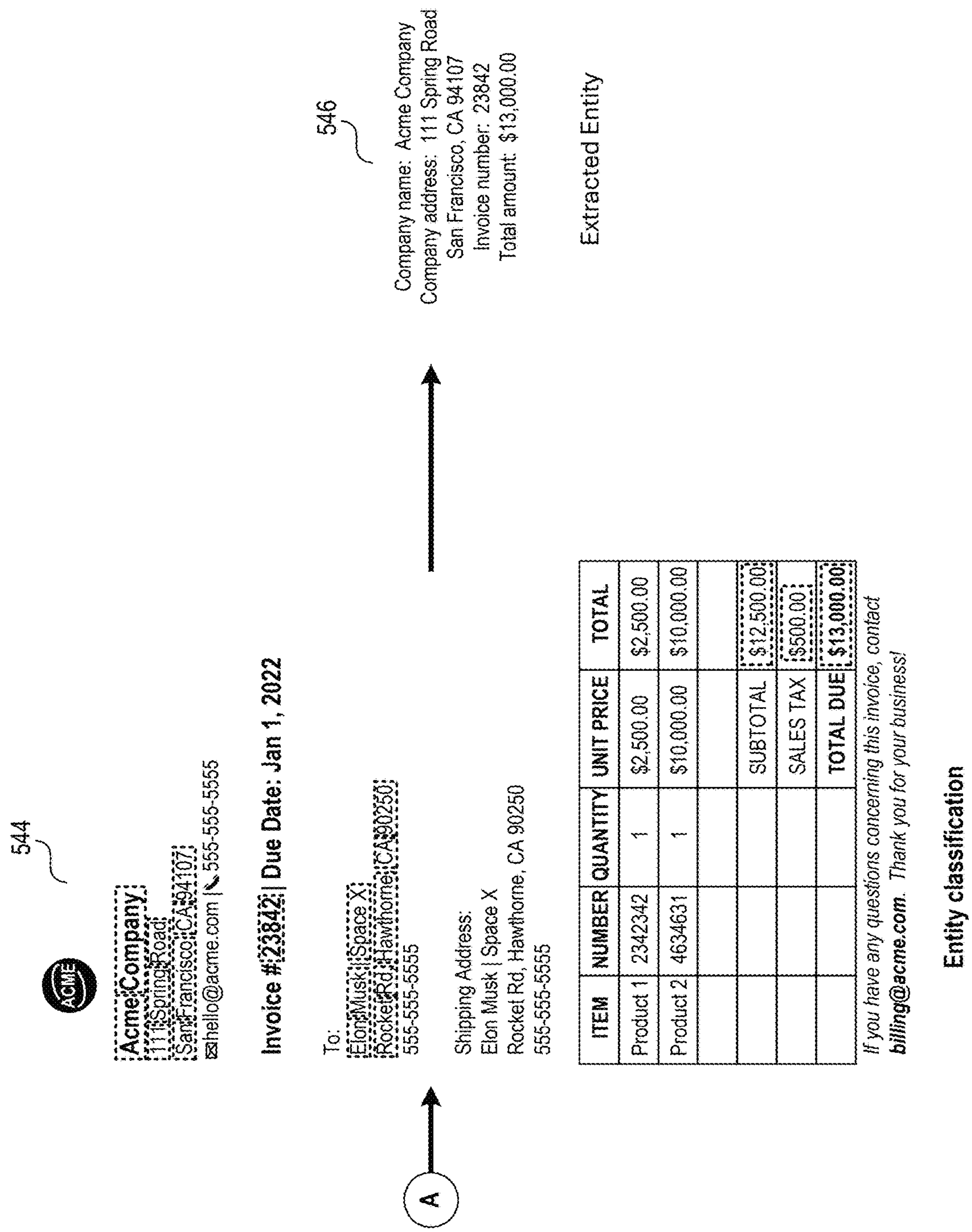

If entities are to be extracted from a particular image, the extraction engine 150 can extract textual, visual, and/or graphical embeddings. FIG. 5D shows the process of extraction of entities such as invoice number, total amount, date, etc. from an image/document that includes textual and/or visual embeddings. Some of the embeddings can be globally applicable to the remainder of the data included in the image. Examples include invoice and/or report header items, such as company address, client information, patient information, and/or the like. Other examples include verification, authorization, and/or authenticity information, such as timestamps, quick response (QR) codes and/or the like. As shown, an input image 540 can be provided (e.g., as a parameter) to a computer-executable script. The computer-executable script can be structured to calculate a set of coordinates for textual embeddings 542*a* within the input image 540.

In some implementations, along with textual embeddings 542*a*, the extraction engine 150 uses a computer-executable script to extract the corresponding image embeddings 542*b*. The textual embeddings 542*a* and image embeddings 542*b* can be provided as a set of inputs to a transformer-based deep learning model, which can help generate the corresponding bounding box coordinates 544 of the required entities. These bounding box coordinates can be used to extract the required entity value by mapping it with the text. For example, the extraction engine 150 can generate structured data set 546 as an output of the input image 540.

Figure 5E:
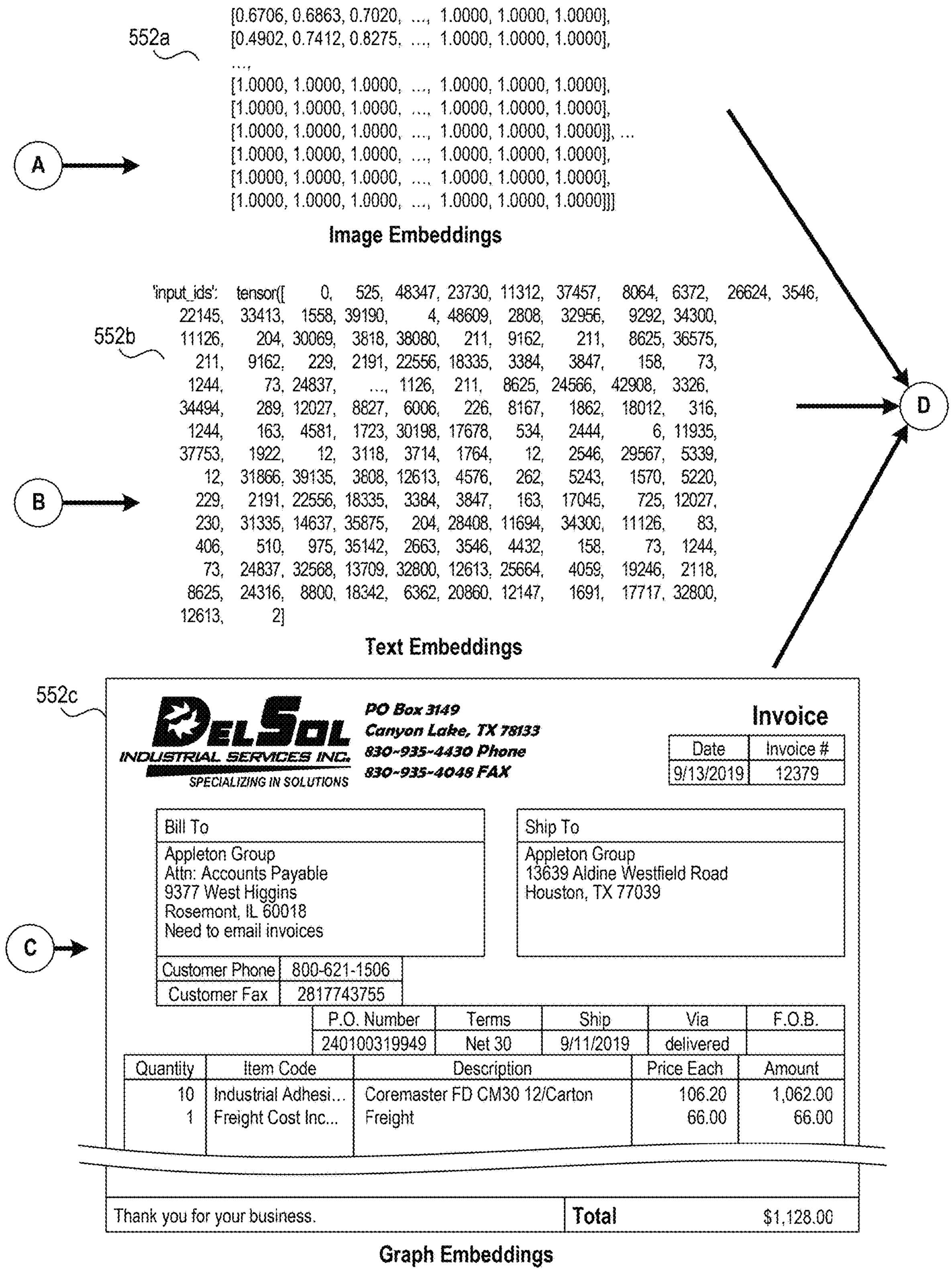
FIG. 5E shows textual extraction operations using a graph convolution network (GCN) of an example machine learning platform according to some implementations of the disclosed technology.
Figure 5E:
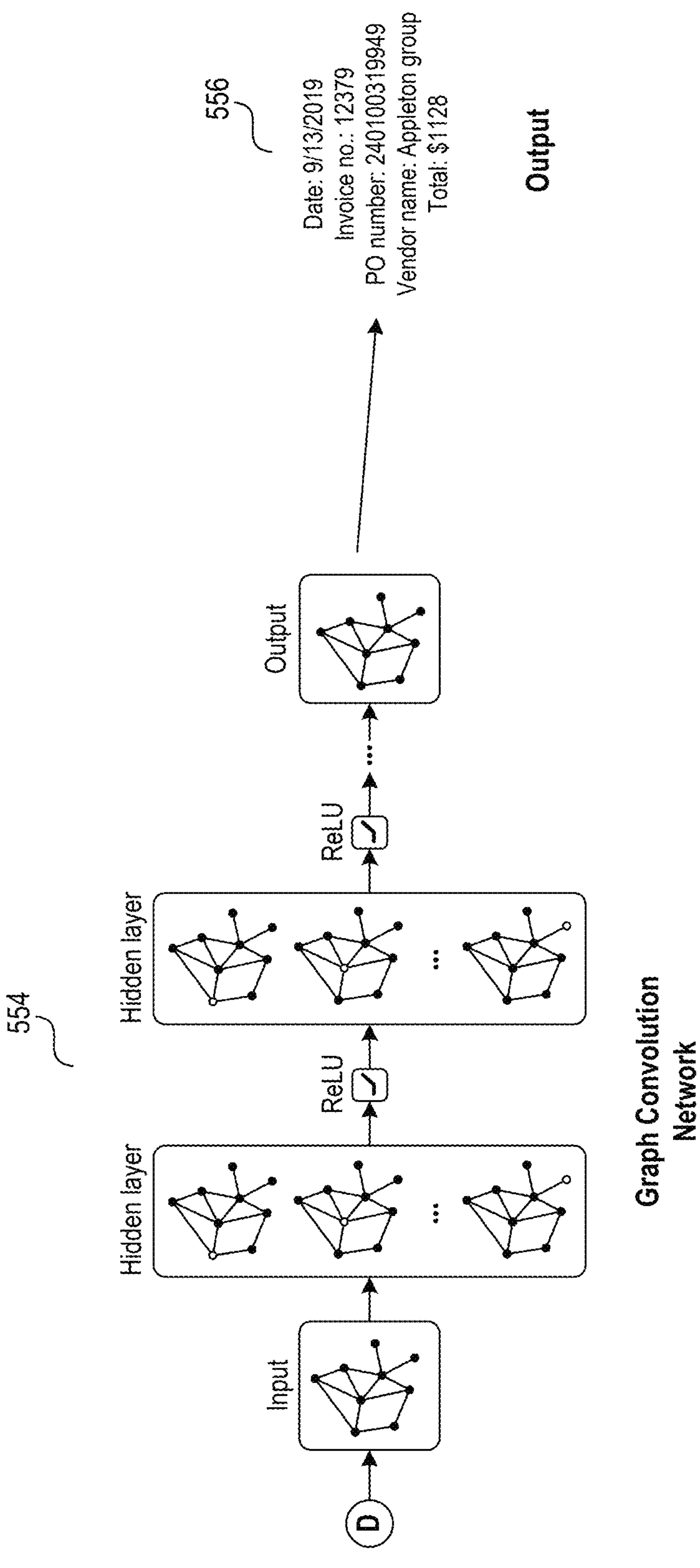

FIG. 5E shows the entity extraction operations using a graph neural network (GNN) of an example machine learning platform according to some implementations of the disclosed technology. When entities are to be extracted from a particular image, the extraction engine can recognize textual, image and/or graphical embeddings. As shown, an input image 550 can be provided (e.g., as a parameter) to a computer-executable script. The computer-executable script can be structured to parse out image embeddings 552*a* and text embeddings 552*b*. Further, the computer-executable script can identify graphical embeddings 552*c*. The computer-executable script can transform the graphical embeddings 552*c* such that each word (token) is considered a node and a link is created between any two nodes adjacent to each other. Accordingly, a portion of the input image 550 can be converted to a graph structure. An aggregated feature vector that includes items 552*a*, 552*b*, and 552*c* can be formed for each node and provided to a GNN 554 trained to generate bounding boxes for each entity type and generate the searchable output 556. In some implementations, the operations can include calculating a plurality of coordinate sets, where each of the coordinate sets is associated with a node. Based on node proximity determined using the coordinate sets, a first node and a second node can be linked (e.g., the closest nodes can be linked) such that the first node and the second node are ordered in phrasal form via the linking.

Semantic Search Operations

Figure 6A:
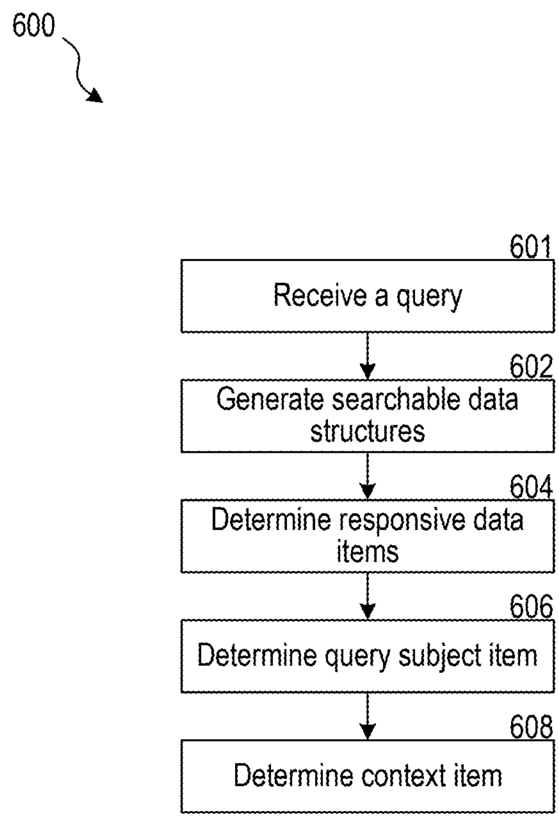
FIG. 6A is a flowchart showing semantic search operations on items in extracted tables of an example machine learning platform according to some implementations of the disclosed technology.

FIG. 6A is a flowchart showing semantic search operations on items in extracted tables of an example machine learning platform according to some implementations of the disclosed technology, and FIGS. 6B-1 to 6D show snapshot inputs and outputs of various operations described in relation to FIG. 6A. In an example implementation, operations of FIG. 6A can be performed by the extraction engine 150 of the analytics environment 120 included in the machine learning platform 100 shown in FIG. 1. However, one of skill will appreciate that the operations can be performed, in whole or in part, on another suitable computing device. As a general overview, the operations of FIG. 6A enable the extraction engine 150 to receive a query, generate one or more searchable data structures, determine data items within the searchable data structure that are responsive to the query, determine query subject data item(s), determine context data item(s) and generate an output responsive to the query.

In an example implementation, semantic search operations allow for entity extraction from complex tables in a particular document represented by an input image. The operations can be executed in a stand-alone fashion (e.g., using a searchable table as an input) or supplement the operations described with respect to FIGS. 5A-5D if cells in extracted tables include data that needs to be further transformed in order to be able to answer complex queries. For instance, if an input image includes a description of various coverage scenarios in an insurance policy, further information can be parsed out from the extracted cells in order to increase the precision level of a response to a query if the entirety of content of a particular cell includes information not needed to generate a query response. In some example use cases, the cells in the extracted tables can include items sufficient to determine query subject, query context, and/or other parameters.

In operation, at 601, the extraction engine 150 can receive a query. In some implementations, the query is a natural language query. The query can be generated via a user interface associated with the platform. In some implementations, an input data stream that includes the query also includes an unstructured data item, such as the input image 610, that is the subject of the query. For example, a platform user can access and cause the user interface to display an insurance policy document and ask a question about the document, such as "What is the in-network provider cost per office visit?" According to various implementations, the user can type the question, speak the question, and/or select the question from the list. In another example, a user can engage with a conversational AI agent, such as a chat bot, and ask the question without accessing or viewing the source document. The conversational AI agent can identify (e.g., based on document metadata) a relevant document and cause the platform to initiate operations 602-608 to generate a response to the question.

At 602, the extraction engine 150 can generate one or more searchable data structures as described, for example, in reference to FIG. 5A. Continuing with the above example, table 612 can be generated to include a subset of the input image 610 in structured form of unmerged rows and columns. For example, the table 612 can include information about the cost of various medical services an insured may need. However, the table 612 can include multiple columns with different informational items, and only a specific subset of columns may be needed to generate a response to the query "What is the in-network provider cost per office visit?".

At 604, the extraction engine 150 can determine data items responsive 614 to the query. In some implementations, where the searchable data structure is a table, the responsive 614 data items can be specific columns. In some implementations, where the searchable data structure is a key-value pair or a markup-language based entity, the responsive 614 data items can be specific labels (keys) and their corresponding values. Continuing with the above example, the responsive 614 data items are columns labeled "services you may need", "network provider", and "out-of-network provider". In some implementations, to identify responsive 614 items, the extraction engine 150 can generate a list of column names or key values and run a semantic similarity model (e.g., a cosine semantic similarity model) to generate the list of candidate responsive columns. In some implementations, the extraction engine 150 can reference supplemental information, such as an ontology, a rule repository, and/or the like to determine labels and/or synonyms to determine the candidate items. The extraction engine 150 can execute validation operations using business rules and/or an ontology to ensure that the determined candidate items (columns) are a likely match to an ontology item that is responsive to a query. For example, if a column header includes the term "services", the term may be considered synonymous to an ontology term "procedures".

At 606, the extraction engine 150 can generate standardized subject 616 item(s) using the responsive 614 items. In some implementations, the standardized subject 616 items are generated by transforming the source-specific responsive 614 items to fit an input-agnostic data structure that enables responses to a variety of queries. For example, the extraction engine 150 can generate a data structure that includes an identifier column and a content column. The identifier column can be populated by, for example, referencing an ontology to identify variants of a particular entity. For instance, when an entity is described as "services you may need", its variants can include "primary care visit", "specialist visit", "immunization", "diagnostic test", and/or the like. The variants can be determined based on the input data from 604. Variants of the particular entity can be responsive to queries, such as "what", "where", and the like (i.e. questions that ask for a subset of information, also referred to herein as "context" about a particular entity). The content column can be populated with items that include further information relevant to the specific variants. In some implementations, the identifier and/or content columns can be populated using values for particular singular responsive 614 items. For example, a single "services you may need" column can correspond to the single identifier column. In some implementations, the identifier and/or content columns can be populated by concatenating values from multiple singular responsive 614 items. For example, data from "network provider" and "out-of-network provider" columns that describe various cost levels can be concatenated such that information across the columns is consolidated.

At 608, the extraction engine 150 can determine, based on the generated variants, one or more contexts 626 relevant to responding to the query. Continuing with the above example, given a query "What is the in-network provider cost per office visit?" and response variants 622 that include "primary care visit", "specialist visit", "immunization", "diagnostic test", and so forth, the determined context can be a "* visit". In some implementations, this determination can be made by referencing an ontology. In some implementations, this determination can be made using a machine learning model (e.g., a cosine semantic similarity model) trained on mapping sets of variants to items within questions in a particular knowledge domain. The extraction engine 150 can narrow down the universe of likely response variants 622 to one or more variants, such as "primary care visit" and "specialist visit". In some implementations, the extraction engine 150 can reference historical data, training data, and/or the like to select a single response variant 622 as most likely context 626. In some implementations, the extraction engine 150 can use information from the content 624 column for a plurality of relevant contexts to generate a plurality of response options.

In some implementations, the data value of the responsive content 624 column can be further parsed and/or processed in order to improve response accuracy. Continuing with the above example and assuming the determined context of "specialist visit", the data value can include a string of sentences listing costs for in-network and out-out-network providers. The costs can include copay amounts and coinsurance amounts, either of which can be responsive to the query "What is the in-network provider copay per office visit?" The machine learning model can be trained to generate various responses based on different subsets of the string of sentences from content 624 and determine confidence scores and/or confidence intervals for each response. The extraction engine 150 can generate a structured output 630 that can include one or more structured response items 632 corresponding to different response options (here, "copay" and "coinsurance"). The structured response items 632 can include one or more attribute sets (634*a*, 634*b*). The attribute sets (634*a*, 634*b*) can be populated with the generated response values. In some implementations, the generated response values can be stored relationally to information that identifies their location in the unstructured source document, such as text coordinates, image coordinates, page number and so forth. In some implementations, the generated response values can be stored relationally to information regarding their likely accuracy, such as probability of accuracy, confidence interval, and/or confidence value.

Computer System

Figure 7:
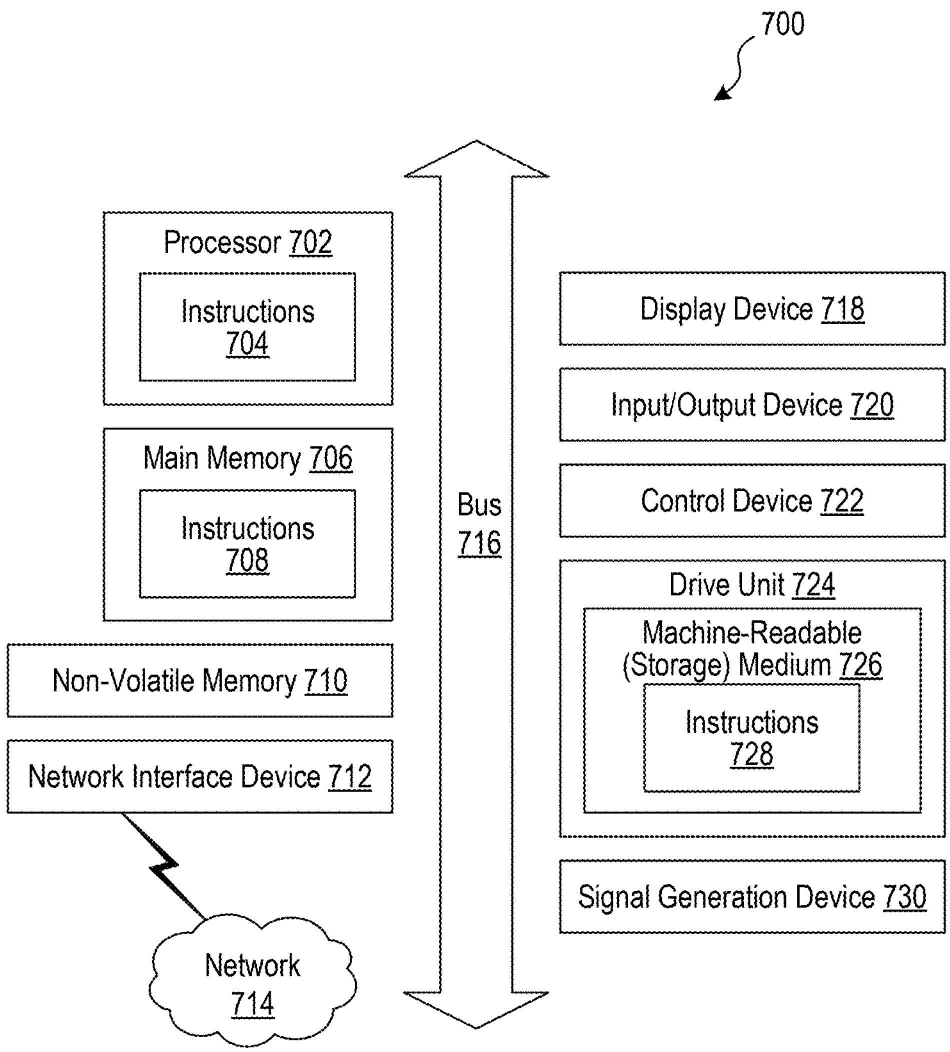
FIG. 7 is a block diagram showing some of the components typically incorporated in at least some of the computer systems and other devices on which the disclosed machine learning platform operates according to some implementations of the disclosed technology.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computer system 700 to exchange data in a network 714 with an entity that is external to the computing system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Computing Environment

Figure 8:
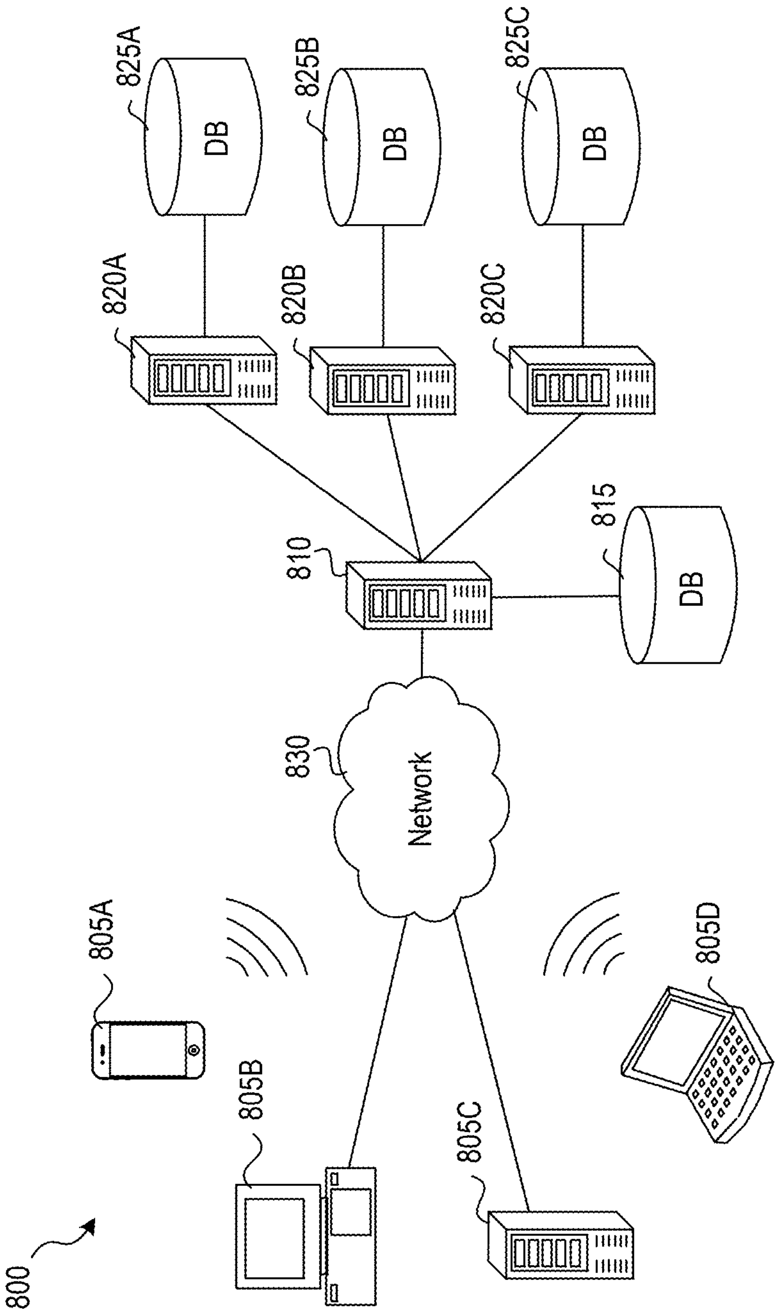
FIG. 8 is a system diagram illustrating an example of a computing environment in which the disclosed machine learning platform operates according to some implementations of the disclosed technology.

FIG. 8 is a system diagram illustrating an example of a computing environment in which the disclosed system operates in some implementations. In some implementations, environment 800 includes one or more client computing devices 805A-D, examples of which can host the machine learning platform 100. Client computing devices 805 operate in a networked environment using logical connections through network 830 to one or more remote computers, such as a server computing device.

In some implementations, server 810 is an edge server which receives client requests and coordinates fulfillment of those requests through other servers, such as servers 620A-C. In some implementations, server computing devices 810 and 820 comprise computing systems, such as the machine learning platform 100. Though each server computing device 810 and 820 is displayed logically as a single server, server computing devices can each be a distributed computing environment encompassing multiple computing devices located at the same or at geographically disparate physical locations. In some implementations, each server 820 corresponds to a group of servers.

Client computing devices 805 and server computing devices 810 and 820 can each act as a server or client to other server or client devices. In some implementations, servers (810, 820A-C) connect to a corresponding database (815, 825A-C). As discussed above, each server 820 can correspond to a group of servers, and each of these servers can share a database or can have its own database. Databases 815 and 825 warehouse (e.g., store) information pertinent to applications described herein, including input data, intermediate processing results, output data, and/or post-processing data. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. In some implementations, network 830 is the Internet or some other public or private network. Client computing devices 805 are connected to network 830 through a network interface, such as by wired or wireless communication. While the connections between server 810 and servers 820 are shown as separate connections, these connections can be any kind of local, wide area, wired, or wireless network, including network 830 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A provider computing system associated with a provider entity and comprising at least one processor, at least one memory, and one or more non-transitory computer readable media, excluding transitory signals, storing instructions, which when executed by the at least one processor, perform operations for generating responses to natural-language queries regarding items in unstructured documents, the operations comprising:

receiving, at an application instance communicatively coupled to a subscriber computing system of a plurality of subscriber computing systems, a query and a document comprising unstructured data;

performing pre-processing operations on at least a portion of the document comprising the unstructured data, the pre-processing operations comprising extracting, by a trained neural network, alphanumeric data from the unstructured data by generating a plurality of bounding boxes, each of the plurality of bounding boxes corresponding to a detected cell in a plurality of cells;

generating a searchable data structure comprising the extracted alphanumeric data;

using the searchable data structure, performing operations comprising:

identifying, in the unstructured data, an image comprising a globally applicable item related to the alphanumeric data;

extracting, from the image, the globally applicable item;

causing the searchable data structure to store the globally applicable item relationally to each row in the alphanumeric data;

generating a query response by performing, by a semantic similarity model, a semantic search using the globally applicable item or at least an additional portion of the searchable data structure;

determining a set of coordinates in the unstructured document, wherein the set of coordinates corresponds to a query response item included in the alphanumeric data;

including the determined set of coordinates in the query response; and transmitting query response to a target application operated or hosted at least in part by the subscriber computing system or a subscriber entity associated with the subscriber computing system.

2. The system of claim 1, wherein the application instance is provided by the provider entity, and wherein the application instance is on a virtual network associated with the subscriber entity.

3. A method for generating responses to natural-language queries regarding items in unstructured documents, the method comprising:

receiving, at an application instance communicatively coupled to a subscriber computing system of a plurality of subscriber computing systems, a query and a document comprising unstructured data;

performing pre-processing operations on at least a portion of the document comprising the unstructured data, the pre-processing operations comprising generating an optimized model input comprising extracting alphanumeric data from the at least a portion of the document;

generating a searchable data structure comprising the alphanumeric data; and for each of the at least one parsed document section and using the searchable data structure, identifying, in the unstructured data, an image comprising a globally applicable item related to the alphanumeric data;

extracting, from the image, the globally applicable item;

causing the searchable data structure to store the globally applicable item relationally to each row in the alphanumeric data;

generating a query response by performing, by a semantic similarity model, a semantic search using the globally applicable item or at least an additional portion of the searchable data structure; and transmitting the query response to a target application operated or hosted at least in part by the subscriber computing system or a subscriber entity associated with the subscriber computing system.

4. The method of claim 3, wherein the searchable data structure comprises a key-value pair.

5. The method of claim 3, wherein the first image comprises a table; and wherein extracting the alphanumeric data comprises generating, by a trained neural network, a plurality of bounding boxes, each corresponding to a detected cell in a plurality of cells from the table.

6. The method of claim 5, wherein the trained neural network is a convolutional neural network (CNN).

7. The method of claim 5, wherein performing the semantic search comprises:

using the searchable data structure, determining, by the trained neural network, a context for the query, the context relating to a value included in the searchable data structure; and generating, using the determined context for the query and the searchable data structure, the at least one response option.

8. The method of claim 7, further comprising:

determining a set of coordinates in the unstructured document, wherein the set of coordinates corresponds to the at least one response option; and generating a second searchable data structure comprising the response option stored relationally to the determined set of coordinates.

9. The method of claim 7, further comprising:

generating a sentence comprising the response option; and providing the generated sentence via an output device associated with the subscriber computing system.

10. The method of claim 3, wherein the extracted globally applicable item comprises an image.

11. The method of claim 3, wherein the extracted globally applicable item comprises alphanumeric information.

12. The method of claim 3, wherein extracting the alphanumeric data comprises:

determining a plurality of coordinate sets, each of the coordinate sets associated with a token included in the second image; and based on token proximity determined using the coordinate sets, linking a first token and a second token included in the second image, wherein at least the first token and the second token are ordered in phrasal form via the linking.

13. The method of claim 3, wherein extracting alphanumeric data from the at least a portion of the document comprises:

using a computer vision machine learning model to:

detect an additional image in the unstructured data, wherein the additional image comprises the alphanumeric data;

generate a bounding box to encapsulate the additional image; and parse, from the additional image, a second image comprising the alphanumeric data, the second image defined by the bounding box;

extracting, by a trained machine learning model, the alphanumeric data from the second image; and generating the optimized model input by applying a domain-specific ontology to at least one of the document and the alphanumeric data.

14. The method of claim 13, wherein the domain-specific ontology relates to at least one of an insurance policy term, medical information, or a medication.

15. The method of claim 3, wherein the subscriber computing system and the target application are provided by the subscriber entity, and wherein the application instance is provided by a provider entity different from the subscriber entity.

16. The method of claim 3, wherein the application instance is on a virtual network associated with the subscriber entity.

17. The method of claim 3, wherein generating optimized model input comprises determining a type of output needed based on at least one of: a previously stored setting, a subscriber-defined runtime parameter or a feature of the target application.

18. One or more non-transitory computer readable media excluding transitory signals, the media storing instructions, which when executed by at least one processor, perform operations for generating responses to natural-language queries regarding items in unstructured documents, the operations comprising:

receiving, at an application instance communicatively coupled to a subscriber computing system of a plurality of subscriber computing systems, a query and a document comprising unstructured data;

performing pre-processing operations on at least a portion of the document comprising the unstructured data, the pre-processing operations comprising generating an optimized model input comprising at least one parsed document section that includes alphanumeric data by:

using a computer vision machine learning model, detecting a first image in the unstructured data, wherein the first image comprises the alphanumeric data;

generating a bounding box to encapsulate the first image;

parsing, from the first image, a second image comprising the alphanumeric data, the second image defined by the bounding box; and extracting, by a trained neural network, the alphanumeric data from the second image;

generating a searchable data structure comprising the alphanumeric data; and for each of the at least one parsed document section and using the searchable data structure, identifying, in the unstructured data, an image comprising a globally applicable item related to the alphanumeric data;

extracting, from the image, the globally applicable item;

causing the searchable data structure to store the globally applicable item relationally to each row in the alphanumeric data;

generating a query response by performing, by a semantic similarity model, a semantic search using the globally applicable item or at least an additional portion of the searchable data structure; and transmitting the query response to a target application operated or hosted at least in part by the subscriber computing system or a subscriber entity associated with the subscriber computing system.

19. The media of claim 18, wherein the application instance is provided by a provider entity different from the subscriber entity, and wherein the application instance is on a virtual network associated with the subscriber entity.

* * * * *